United States Patent [19]

Zeavin

[11] Patent Number: 4,608,615
[45] Date of Patent: Aug. 26, 1986

[54] HALF HEIGHT DATA CARTRIDGE TAPE DRIVE

[76] Inventor: Mark Zeavin, 27 E. Las Flores Dr., Altadena, Calif. 91001

[21] Appl. No.: 605,715

[22] Filed: Apr. 30, 1984

[51] Int. Cl.⁴ .................... G11B 21/02; G11B 15/00
[52] U.S. Cl. .................................. 360/96.5; 360/96.1
[58] Field of Search ............... 360/96.5, 96.6, 96.1, 360/132; 242/198

[56] References Cited

U.S. PATENT DOCUMENTS

| | | | |
|---|---|---|---|
| 2,971,716 | 2/1961 | Samson | 242/188 |
| 3,137,430 | 6/1964 | Aldridge | 226/180 |
| 3,495,835 | 2/1970 | Laa | 360/96.5 |
| 3,729,202 | 4/1973 | Wakabayashi | 360/96.6 |
| 3,800,323 | 3/1974 | Jenkins | 360/96.1 |
| 3,924,823 | 12/1975 | Cohen et al. | 242/198 |
| 4,127,883 | 11/1978 | Mestdagh | 360/96 |
| 4,130,848 | 12/1978 | Amano et al. | 360/132 |
| 4,309,733 | 1/1982 | Tomabechi | 360/96.1 |

Primary Examiner—John H. Wolff
Assistant Examiner—Matthew Bussan
Attorney, Agent, or Firm—Nilsson, Robbins, Dalgarn, Berliner, Carson & Wurst

[57] ABSTRACT

A half height data cartridge tape drive mechanism includes a deck pivotally attached to a baseplate. An engagement lever is connected to pivot linkage to pivot the deck; to eject linkage to eject a cartridge in the tape drive; and a cartridge door opening mechanism for opening the cartridge door in response to movement of the engagement lever into various positions. A drive motor is interconnected by a drive belt to rotate a capstan assembly. The capstan assembly engages a drive roller of a cartridge to cause movement of a magnetic tape in the cartridge. Indexing pins and slots engage the front corners of the cartridge and operate in conjunction with a center-of-gravity pad and tilt cam on the deck and an offset fulcrum and tilt stop on the housing to align with a magnetic head mounted on the deck. A head positioning assembly mounted on the deck includes a stepper motor with a worm gear attached to the motor's drive axle, a transfer beam is pivotally mounted to the deck at its center and is interconnected to the worm gear at one of its ends for moving the one end vertically along the worm gear upon rotation of the drive axle by the stepper motor. A parallel flexure is attached to the deck at one of its ends and to the other end of the transfer beam at its other end. A magnetic head is mounted to the other end of the parallel flexure. A drive tire is stretched around the drive capstan to engage the drive roller of the cartridge.

57 Claims, 34 Drawing Figures

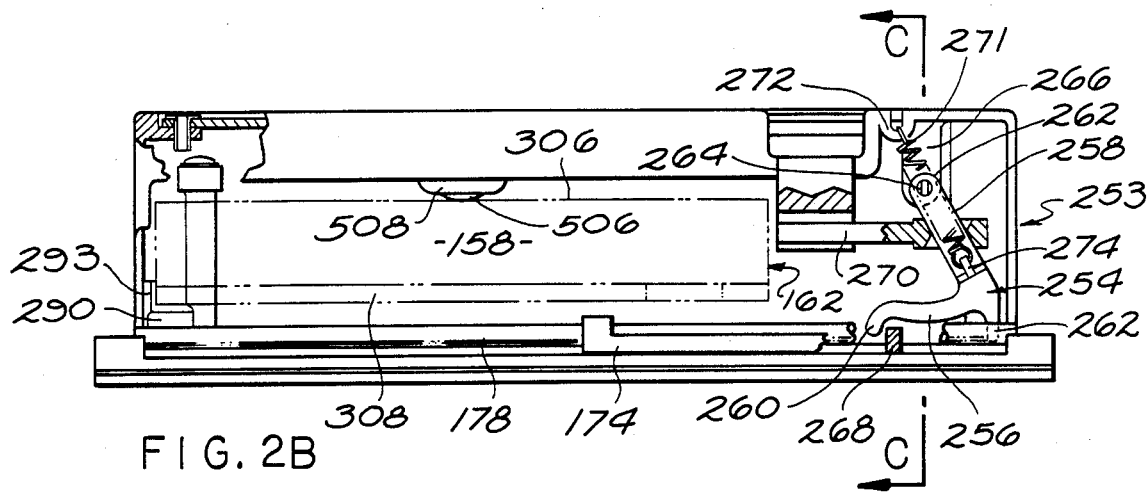
FIG. 2B
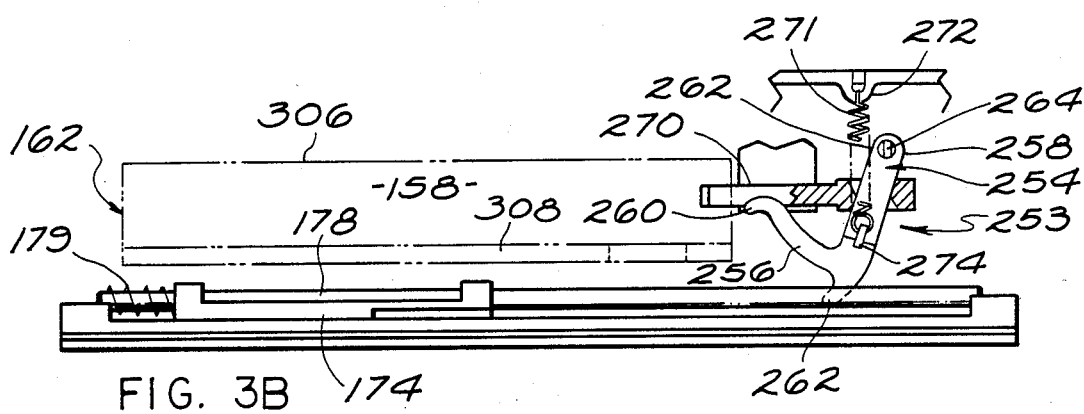
FIG. 3B
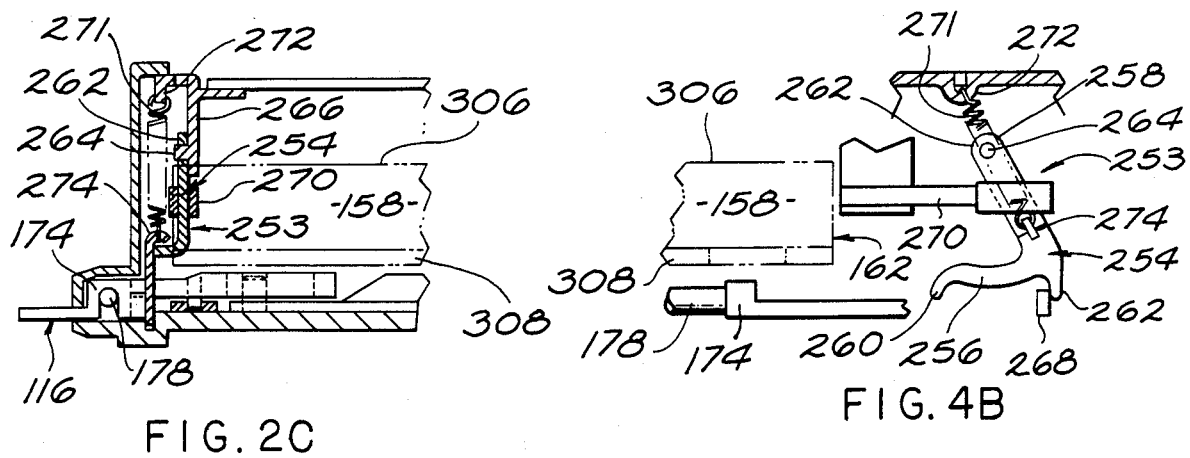
FIG. 2C
FIG. 4B

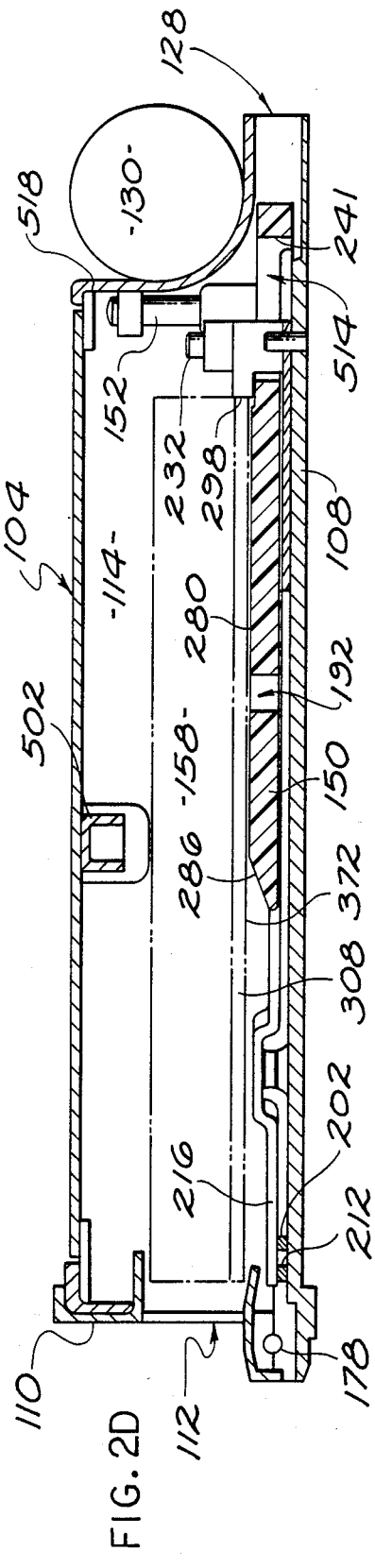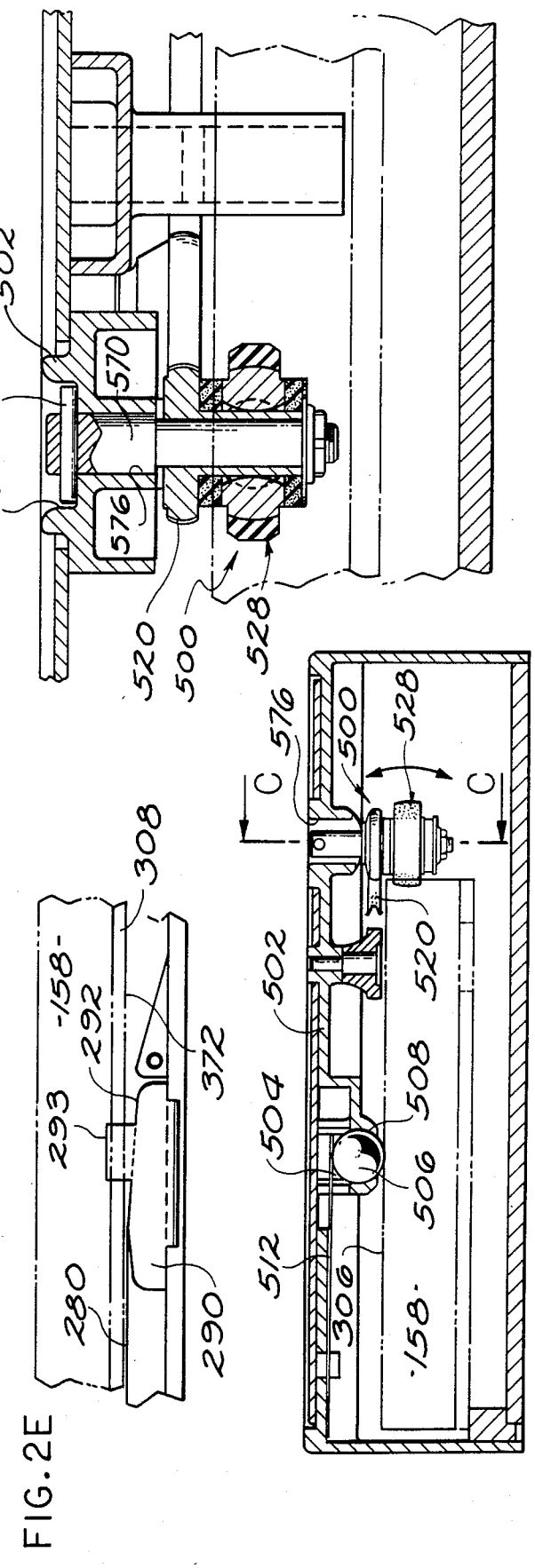

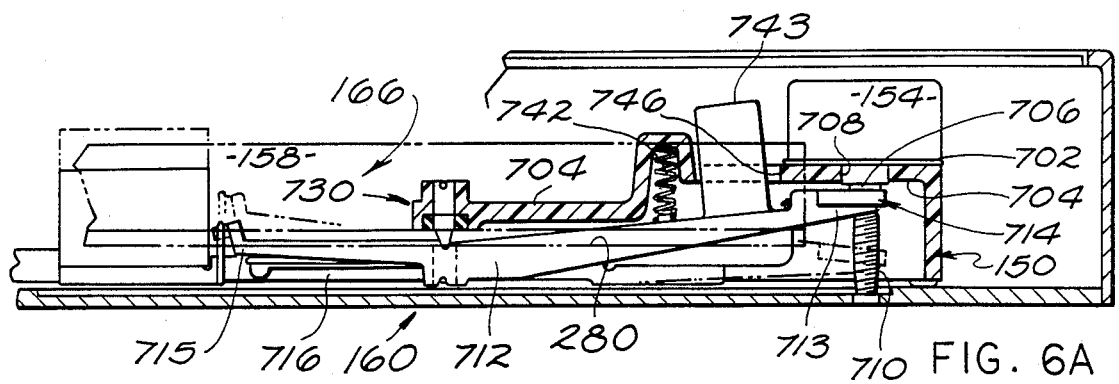
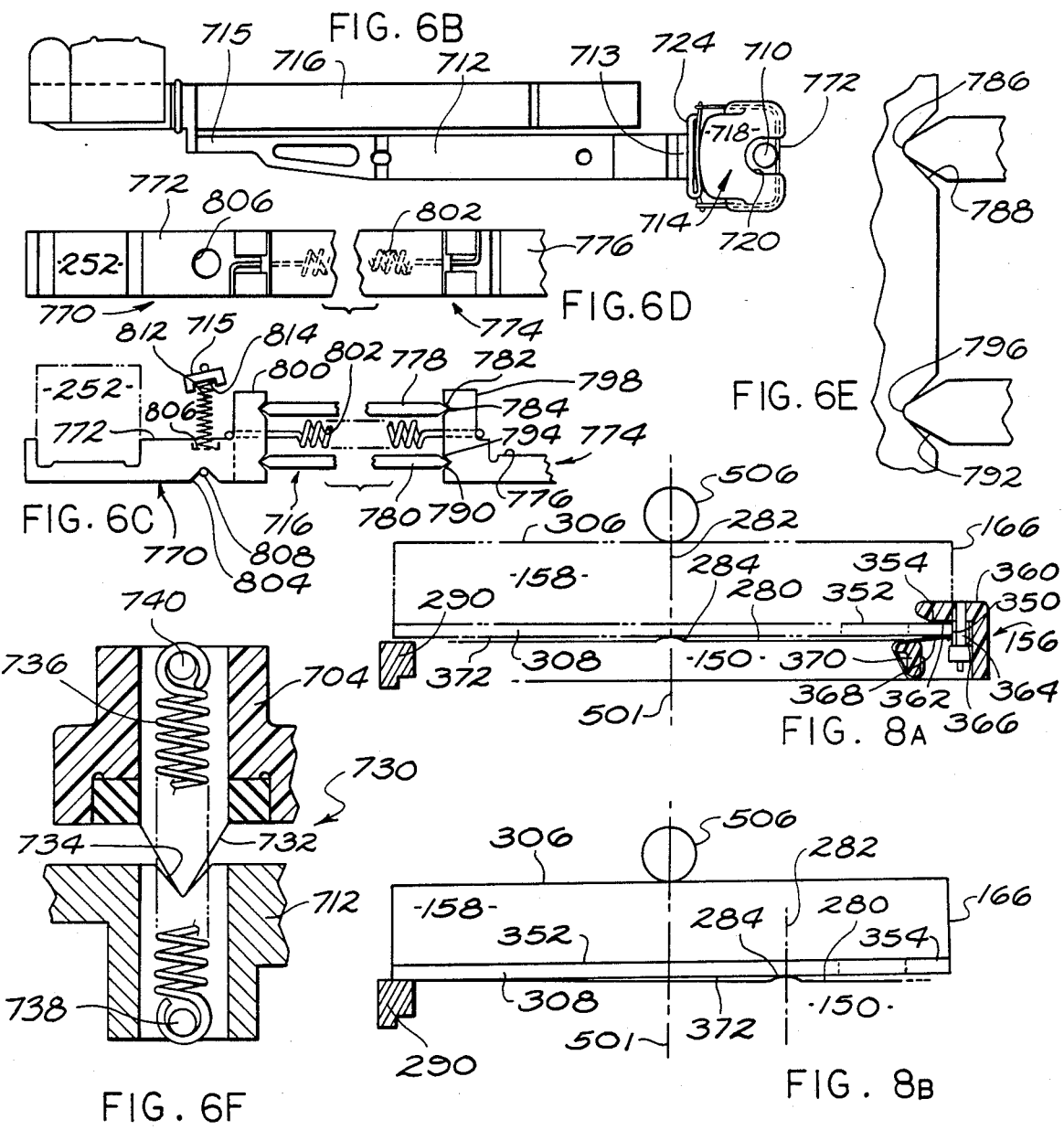

HALF HEIGHT DATA CARTRIDGE TAPE DRIVE

BACKGROUND OF THE INVENTION

The present invention relates to a data cartridge tape drive and specifically to a half height cartridge tape drive having a pivotal deck which engages and aligns the cartridge with the magnetic head upon rotation of the pivotal deck into engagement with the cartridge.

Data cartridges for use in storing digital information for use in computor applications are known. Such cartridges incorporate a length of magnetic recording tape which is wound between a pair of spools or reels which are rotated by a belt which moves in response to rotation of a drive roller. A typical belt driven tape cartridge of the type utilized in the present invention is shown in U. S. Pat. No. 3,692,255 which shows a two spool tape cartridge in which a flexible belt extends around guide rollers adjacent the pair of spools and a drive roller between the spools. Rotation of the drive roller causes the belt to drive the tape spools to provide proper tensioning of the tape and to move the tape between the spools. Access to the magnetic tape in the cartridge by a magnetic head is provided through an opening along one edge of the cartridge. When not in use, the tape is protected by a pivotal door which closes over the opening.

A cartridge of this configuration permits bidirectional drive and rapid acceleration and deceleration of the tape which is a requirement of tape cartridges used in computer applications.

Cartridge tape drives for such cartridges are known. Such tape drives typically incorporate a drive mechanism which contacts the drive roller of the cartridge to effect rotation of the spools on which the magnetic tape is wound. Additionally, conventional cartridge tape drives include a magnetic head which may or may not be vertically movable to contract different tracks on the tape, positioned to contact the magnetic tape passing through the opening in the edge of the cartridge. Such cartridge tape drives also provide some manual or automatic mechanism for pivoting the door over the edge opening in the cartridge to enable magnetic head access to the exposed portion of the magnetic tape passing through the opening. Conventional cartridge tape drives further include an indexing or registration mechanism for precisely positioning the cartridge, and hence the tape, relative to the magnetic head, so that the magnetic head will contact the magnetic tape at a predefined location and orientation so as to enable reading of data from and writing data onto the magnetic tape.

Cartridge tape drives have also included a head positioning mechanism for vertically positioning the magnetic head relative to the tape to position the head opposite selected tracks on the magnetic tape so as to enable reading data from or writing data onto that particular track.

Conventional cartridge tape drives having one or more of the above described features have generally had a height of 3¼" or greater where the magnetic head, the various indexing and registration pins and the like are fixed as part of the cartridge tape drive so that registration between the head and the cartridge must be accomplished by movement of the cartridge itself.

Proposals to incorporate a moveable deck on which the magnetic head is fixed involve a different class of problems. For example, registration pins, when not fixed to the movable deck, may become misaligned relative to the deck and hence the magnetic head. Alignment of the cartridge with the registration pins may result in imprecise positioning of the head with the tape in the cartridge. The fact that the head can move relative to the registration pin therefore presents difficulties in achieving and maintaining the alignment precision necessary for positioning the head relative to the tape in the cartridge. Furthermore, proposals for locating the head on a moveable deck have generally included proposals for additional complex mechanisms which work in conjunction with the movable deck to position the cartridge and thereafter hold the cartridge in a precise fixed orientation relative to the head when the deck has moved into a predefined engagement position. Additionally, prior art devices as well as proposed movable deck devices have required cartridge door opening mechanism which require pre-opening of the door before or as a part of the insertion of the cartridge into the cartridge tape drive. Finally, all of the above problems and features are amplified and exaggerated when it is desired to have a cartridge tape drive which is not of a conventional height of 3¼" but of half that height, that is, 1⅝".

Accordingly, the present invention provides a half height data cartridge tape drive incorporating a pivotal deck which pivots through an arc of 12½ and on which are mounted, in fixed horizontal relationship to each other, the index (registration) pins and the magnetic head. The magnetic head is provided with a head positioning mechanism which permits precise, non-arcuate, vertical movement of the magnetic head relative to the tape to precisely position the head at a pre-defined vertical track on the tape. The present invention further provides a half height cartridge tape drive which precisely positions and aligns the data cartridge, after the cartridge has been fully inserted, solely as a consequence of pivotal movement of the deck into the engaged position. The tape drive of the present invention includes a manually actuated lever. As the lever is moved toward the engaged position, a door opening mechanism is incorporated to open the door. After the door is fully opened, further movement of the lever initiates pivotal movement of the deck whereby the magnetic head is rotated into engagement against the magnetic tape.

The pivotal deck, side walls of the tape drive housing, and the top of the tape drive housing include precisely placed pads, ramps, cams and other positioning devices positioned in coordination with indexing pins and surfaces on the deck to effect precise orientation and positioning of the cartridge relative to the deck and hence to the magnetic head. These pads, ramps, cams, index pins and index surfaces cooperate with the pivoting deck without the need of separate mechanical linkages to effect positioning of the cartridge. Hence, movement of the manual lever effects, in precise sequence, the opening of the cartridge door, the horizontal positioning of the cartridge relative to the head, and the precise vertical registration of the cartridge relative to the head, all as an integral consequence of pivoting the deck into an engaged position.

Additionally, the present invention provides for a novel ejection linkage as well as a novel vertical head positioning mechanism whereby the head may be moved in a precise vertical direction rather than in an arcuate manner relative to the magnetic tape when the head is in contact with the magnetic tape. Finally, the present invention incorporates a novel drive mechanism which incorporates a stretched drive tire over a drive capstan, which stretch drive tire contacts the drive roller of the cartridge to effect rotation of the spools and hence movement of the magnetic tape of in the cartridge. The stretched drive tire permits a smaller change in drive roller velocity in response to variations in the pressure applied against the drive roller by the drive capstan to enable greater precision in data transfer between tape and magnetic head.

SUMMARY OF THE INVENTION

The data cartridge tape drive in accordance with the invention includes a housing with a base plate with a deck pivotally mounted on the base plate for being pivotal between an engaged position and a disengaged position. A cartridge positioning and registration means including precisely positioned pads, ramps, cams and the like on the housing and index pins and surfaces fixed to the deck, are incorporated to effect positioning of an inserted cartridge at a predefined precise orientation relative to the head solely in response to and as a consequence of pivotal movement of the deck from a disengaged position into an engaged position in response to movement of an engagement lever. A cartridge door opening means is also coupled to the engagement level to effect opening of the cartridge door immediately before the deck commences pivoting from the disengaged position to the engaged position.

In accordance with the invention, a pair of index pins are positioned on the deck in precise, horizontal and vertical orientation to the magnetic head. The magnetic head positioning means permits vertical movement of the head relative to the deck by precise distances to effect precise orientation of the head against a selected track on the magnetic tape. Hence, the index or registration pins on the deck are in a precise position relative to one another at all times and independent of the pivotal movement of the deck. A raised support pad (center-of-gravity or c.g. pad) at a precise, pre-defined height above the surface of the pivotal deck is provided at a location which preferably will align with the center of gravity of the cartridge when the cartridge is fully inserted and the deck is in the fully engaged position. A tilt stop protruding from the frame to the interior of the housing at a location abutting against the rear edge wall of the cartridge when the cartridge is fully inserted but before the deck is pivoted to the engaged position and an offset fulcrum protruding from the frame toward the interior of the housing at a location for abutting against the rear edge wall of the cartridge at a central location of the cartridge are provided for cartridge positioning. When the cartridge is fully inserted, and the pivotal deck is pivoted into the engaged position, the cartridge is pivoted about the offset fulcrum whereby the rear edge wall of the cartridge moves out of contact with the tilt stop as a result of the engagement with the frontmost index pin. In accordance with the invention, the frontmost index pin first contacts the cartridge and immediately thereafter the second index pin at the rear of the tape cartridge contacts the cartridge. Thus, when the pivotal deck reaches the fully engaged position, the cartridge will be precisely horizontally positioned by the index pins and the offset fulcrum.

Vertical positioning is achieved by a pair of springs adjacent each of the index pins which press indexing surfaces on opposite edges of the cartridge against a precisely positioned and fixed indexed surfaces on the deck and further precisely positions the cartridge. Only nominal force is required to tilt the cartridge into the desired vertical position because the cartridge will be supported at its center of gravity by the c.g. pad on the deck. Such positioning and registration of the cartridge is an automatic consequence of pivotal movement of the deck into the fully engaged position and hence requires no other moveable linkages or mechanisms.

The present invention further includes a cartridge door opening mechanism which is interconnected to the manually operable engagement lever so that after the cartridge has been fully inserted in the cartridge tape drive, movement of the engagement lever first actuates the door opening mechanism to effect opening of the cartridge door. Thereafter, further movement of the engagement lever, after the cartridge door is fully opened, causes the pivotal movement of the deck from the fully disengaged position to the fully engaged position.

The present invention further includes a tiltable capstan assembly and a drive means to effect rotation of the drive capstan. The capstan assembly is tiltable to move away from the cartridge during insertion of the cartridge. Upon full insertion of the cartridge, the capstan assembly will be positioned opposite an opening in the center of the cartridge opposite the cartridge drive roller whereupon the capstan assembly tilts back into engagement with the drive roller of the cartridge to effect rotation of the drive roller and hence movement of the magnetic tape in the cartridge. A stretched tire is positioned around the capstan to contact the drive roller of the cartridge.

The present invention also includes a magnetic head assembly which includes a parallel flexure which flexes vertically in response to pivoting of a transfer beam about a center fulcrum. One edge of the transfer beam is interconnected to a stepper motor and a worm gear with the other end of the transfer beam interconnected to one end of the parallel flexure. Thus, pivotal movement of the transfer beam effects a precise vertical movement of the one end of the flexure. The magnetic head is then mounted on the one end of the parallel flexure to thereby provide precise, non-arcuate vertical movement of the head in response to rotation of the stepper motor.

BRIEF DESCRIPTION OF THE DRAWINGS

A complete understanding of the present invention and of the above and other features and advantages thereof may be gained from a consideration of the following description of the preferred embodiments taken in conjunction with the accompanying drawings in which:

FIG. 2B is a front cross sectional plan view of the data tape cartridge drive mechanism particularly showing the cartridge door opening mechanism with the cartridge door in the closed position.

FIG. 2C is a partial cross sectional view, side plan view of the door opening mechanism.

FIG. 2D is a cross sectional side plan view through a central section of the cartridge tape drive mechanism.

FIG. 2E is a cross sectional partial side view illustrating an embodiment of the offset fulcrum.

FIG. 3B is a partial front cross sectional view illustrating the door opening mechanism in an orientation where the door of the cartridge is in the opened position.

FIG. 4B is a partial side view illustrating the position of the various elements of the cartridge door opening mechanism when the engagement lever is in the eject position.

FIG. 5B is a cross sectional side view showing the capstan assembly and the mechanism for pressing against the top of the cartridge to retain the cartridge in position.

FIG. 5C is a partial cross sectional side view of the capstan assembly.

FIG. 6A is a partial cross sectional side plan view illustrating the magnetic head vertical positioning assembly.

FIG. 6B is a top detail view of the transfer beam, worm gear and parallel flexure in accordance with the invention.

/FIG. 6C is a side plan view of one embodiment of the parallel flexure in accordance with the invention.

FIG. 6D is a top plan view of the parallel flexure of FIG. 6C.

FIG. 6E is a side detail view illustrating the hinge points of the parallel flexure shown in FIGS. 6C and 6D.

FIG. 6F is a side plan detail view of the spring loaded fulcrum about which the transfer beam pivots in accordance with the invention.

FIG. 8A is a side schematic view of the vertical registration mechanism of the invention when the pivotal deck is in the fully engaged position.

FIG. 8B is a partial side schematic view illustrating the positioning of the center of gravity pad on the pivotal deck relative to the cartridge when the pivotal deck is in the disengaged position.

DETAILED DESCRIPTION

Figure 1:
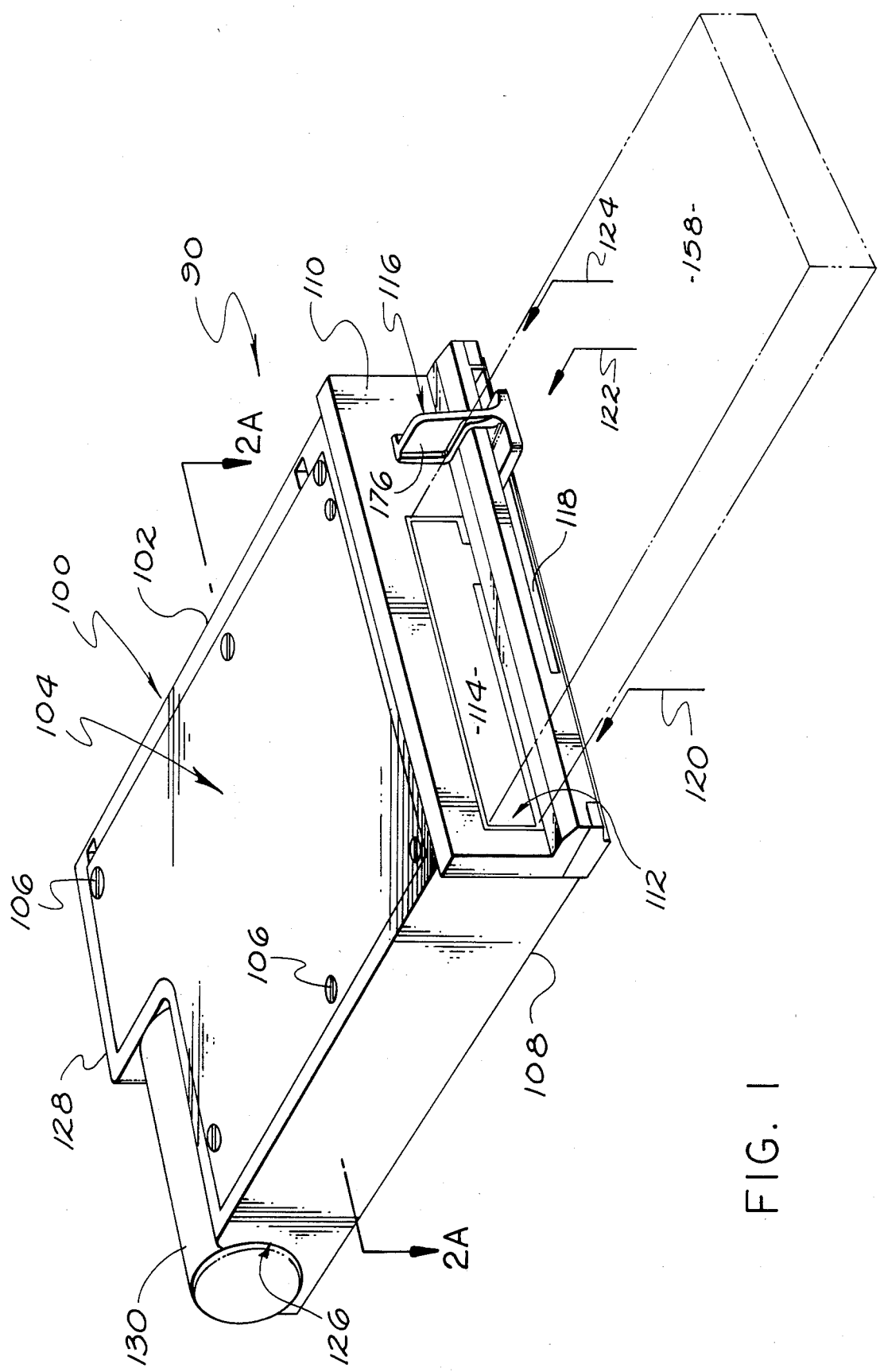
FIG. 1 is a pictorial view of the cartridge tape drive in accordance with the invention.

Referring initially to FIG. 1, a half height data cartridge tape drive 90 includes a housing 100 which includes a peripheral frame 102, a cover member 104 attached to the peripheral frame 102 by suitable fasteners 106 to define a top of the housing, and a base plate 108 attached to the peripheral frame 102 in spaced from, but generally parallel orientation to the cover member 104 to define a bottom of the housing 100. A facia member 110 is attached to one end of the peripheral frame 102 to define a front of the housing 100. The facia member 110 has a cartridge insertion port 112 sized for receiving a cartridge for positioning in an interior region 114 of the housing 100. An engagement lever 116 which is manually actuable extends from a slot 118 disposed along a portion of the lower part of the facia member 110. The engagement lever 116 is translationally slidable along the slot 118 between a latched or engaged position 120, a park position 122 and an eject position 124. The eject position 124 and the park position 122 define disengaged positions of the engagement lever 116.

A concavity 126 is provided in the rear 128 of the housing 100. The concavity 126 is configured to receive a drive motor 130 on the outside of the interior region 114 of the housing 100. The drive motor 130 is preferably placed outside of the interior region 114 of the housing 100 to facilitate dissipation of heat generated by the drive motor 130 and thereby prevent excessive and detrimental heating of the interior region 114.

Figure 2A:
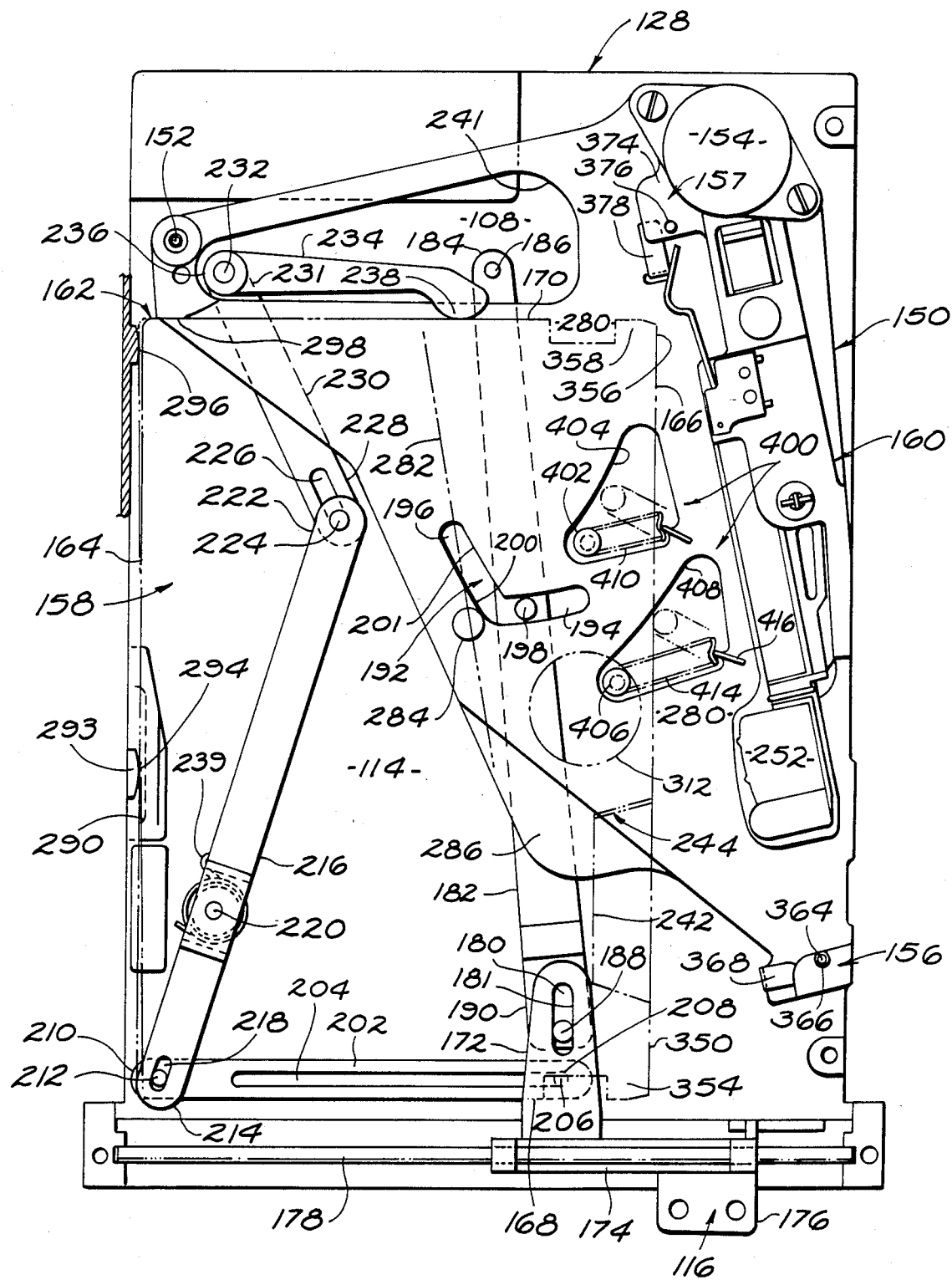
FIG. 2A is a top plan view of the interior of cartridge tape drive in accordance with the invention showing the pivotal deck in the disengaged position.
Figure 3A:
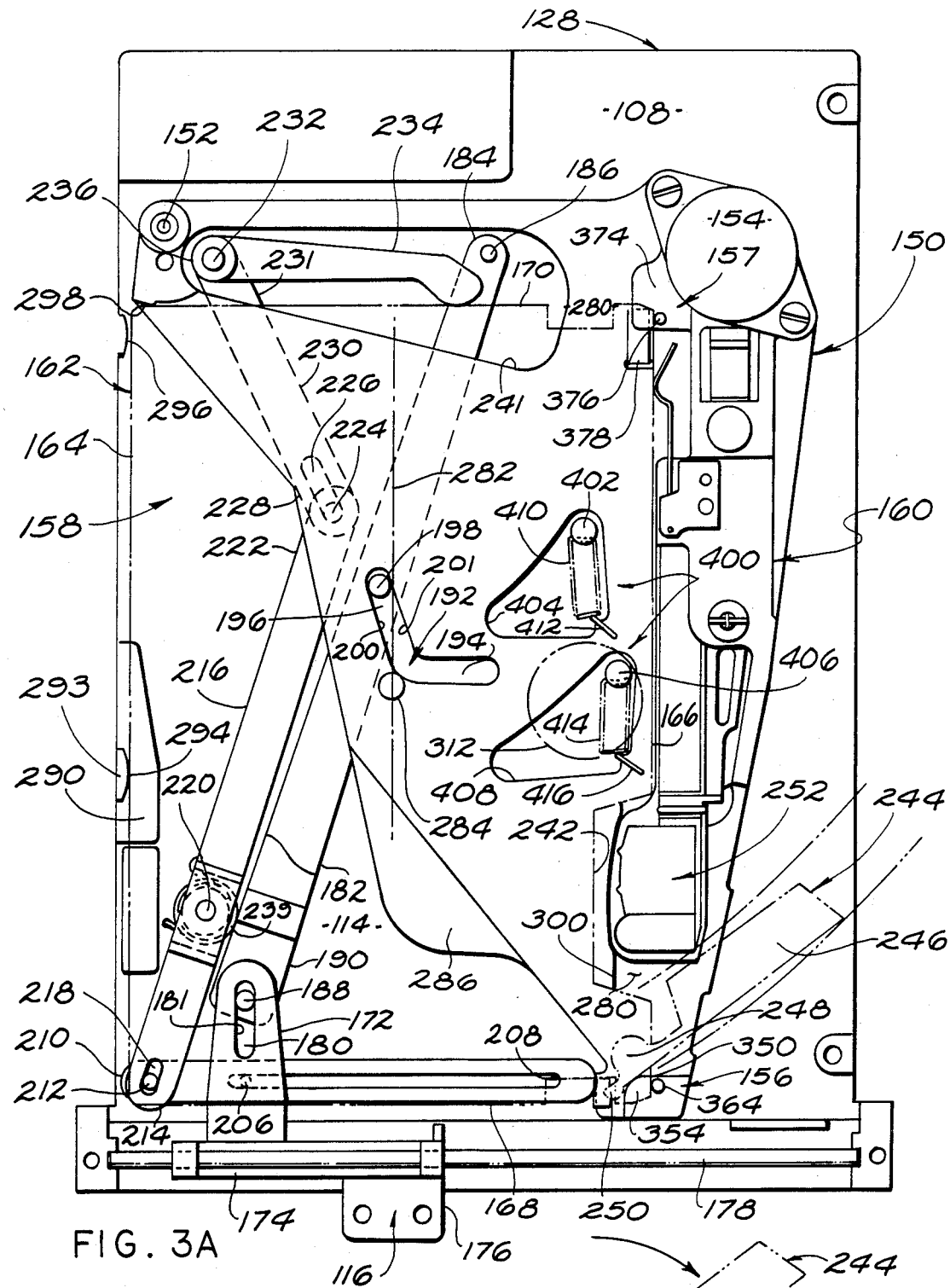
FIG. 3A is a top plan view of the interior of the cartridge tape drive illustrating the pivotal deck position in the fully engaged position.
Figure 4A:
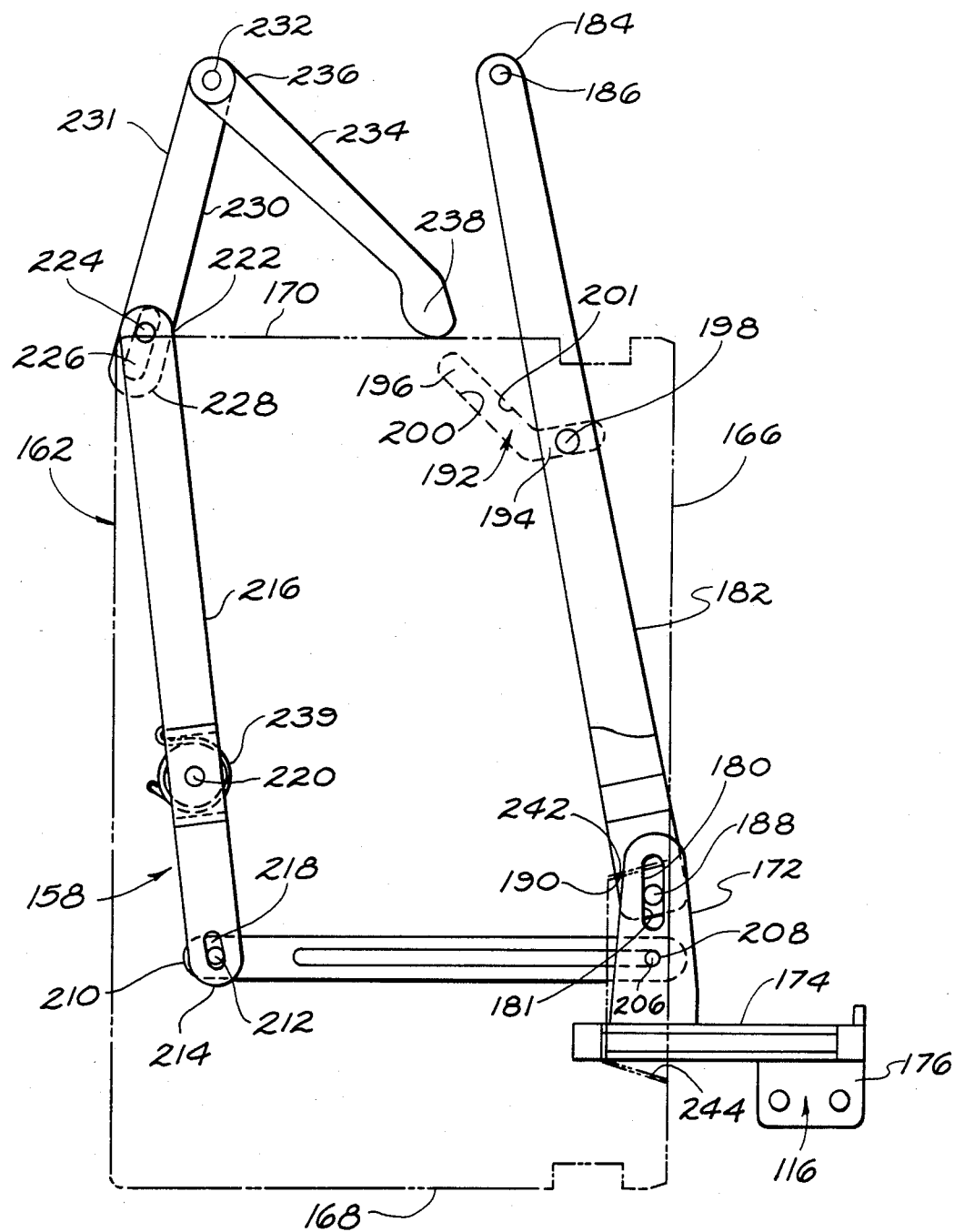
FIG. 4A is a top view of the deck pivoting linkage and the eject linkage in accordance with the invention.

Referring to FIGS. 2A, 2D, 3A and 4A, the various linkages which cause engagement and ejection of a cartridge are illustrated. Specifically, the data cartridge tape drive includes in its interior region 114 a pivotal deck 150 which is pivotally mounted to the base plate 108 via a deck pivot pin 152. FIG. 2A shows the deck 150 in a disengaged position, FIG. 3A illustrates the deck 150 in a fully engaged position and FIG. 4A illustrates the linkages when the engagement lever 116 is in the eject position 124. The deck 150 has a generally triangular shape with the deck pivot pin 152 at one corner, a stepper motor 154 at a second corner and a first index pin assembly 156 mounted at a third corner. A magnetic head positioning assembly 160, which includes the stepper motor 154, is mounted to the deck 150.

For purposes of explanation, a cartridge 158 to be inserted in the cartridge insertion port 112 (FIGS. 1 and 2D) includes a peripheral edgewall 162 consisting of a rear edgewall portion 164, an oppositely disposed front edgewall portion 166, a first side edgewall portion 168 which, for purposes of explanation of the invention, is taken to be the side edgewall nearest the cartridge insertion port 112 when the cartridge 158 is fully inserted in the interior region 114 of the housing 100, and a second side edgewall 170 opposite the first side edgewall 168 and taken to be the side edgewall of the cartridge 158 nearest the rear 128 of the housing when the cartridge 158 is fully inserted in the interior region 114 of the housing 100.

Figures 7A, 7B:
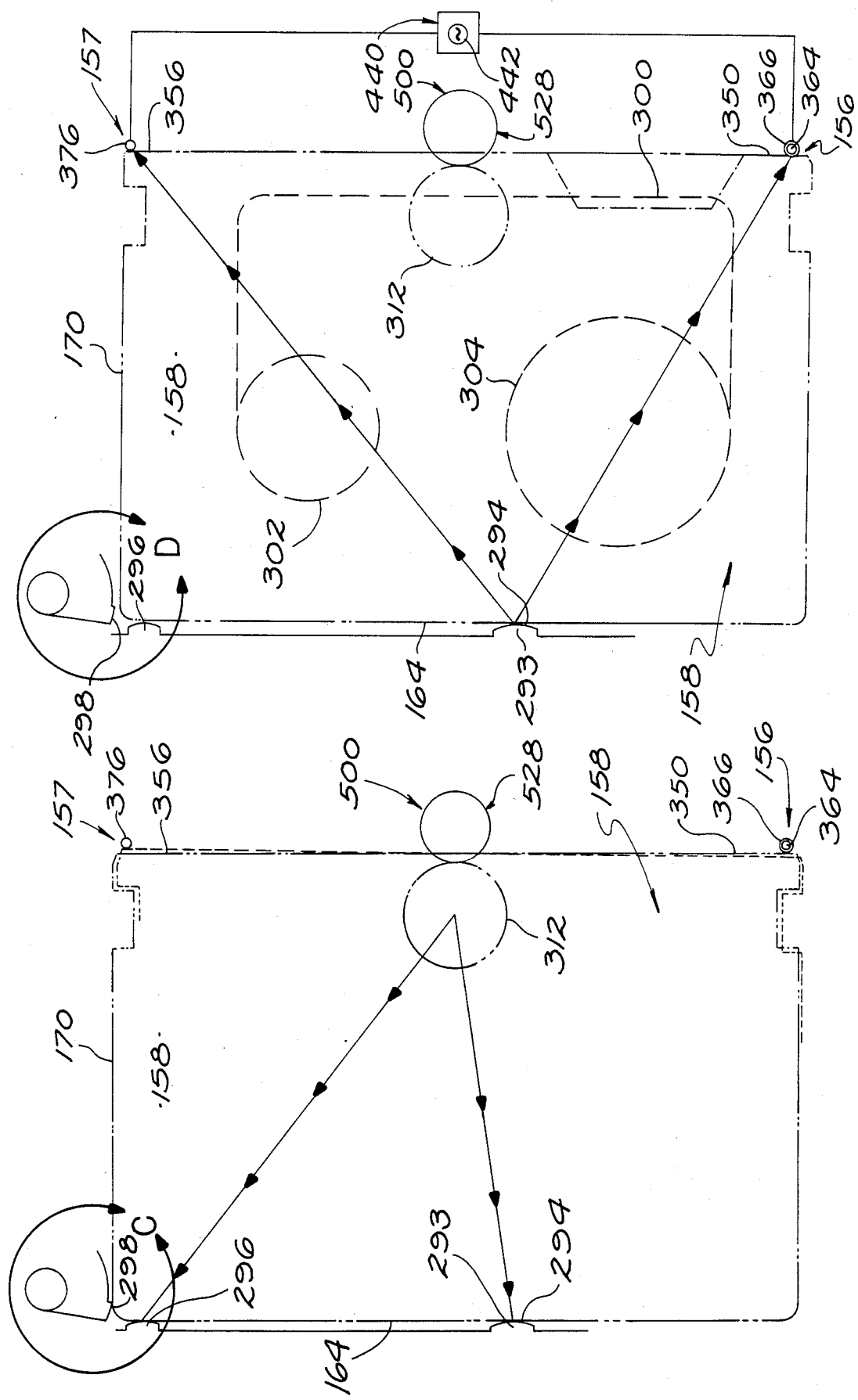
FIG. 7A is a top schematic drawing illustrating the positioning of the data cartridge immediately prior to pivoting of the deck into the fully engaged position.
FIG. 7B is a top schematic drawing illustrating the pivotal movement of the deck about the offset fulcrum when the pivotal deck reaches the fully engaged position.
Figure 10A:
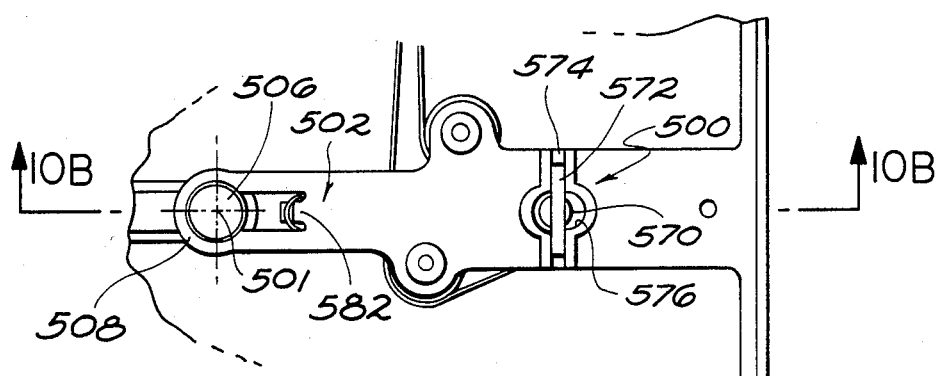
FIG. 10A is a top partial view of part of the drive mechanism of the capstan assembly.
Figure 10B:
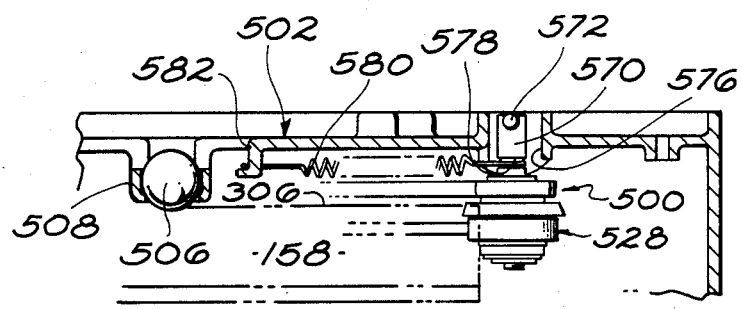
FIG. 10B is a partial side cross-sectional view of the loading ball mechanism and the tiltable capstan assembly.
Figure 10C:
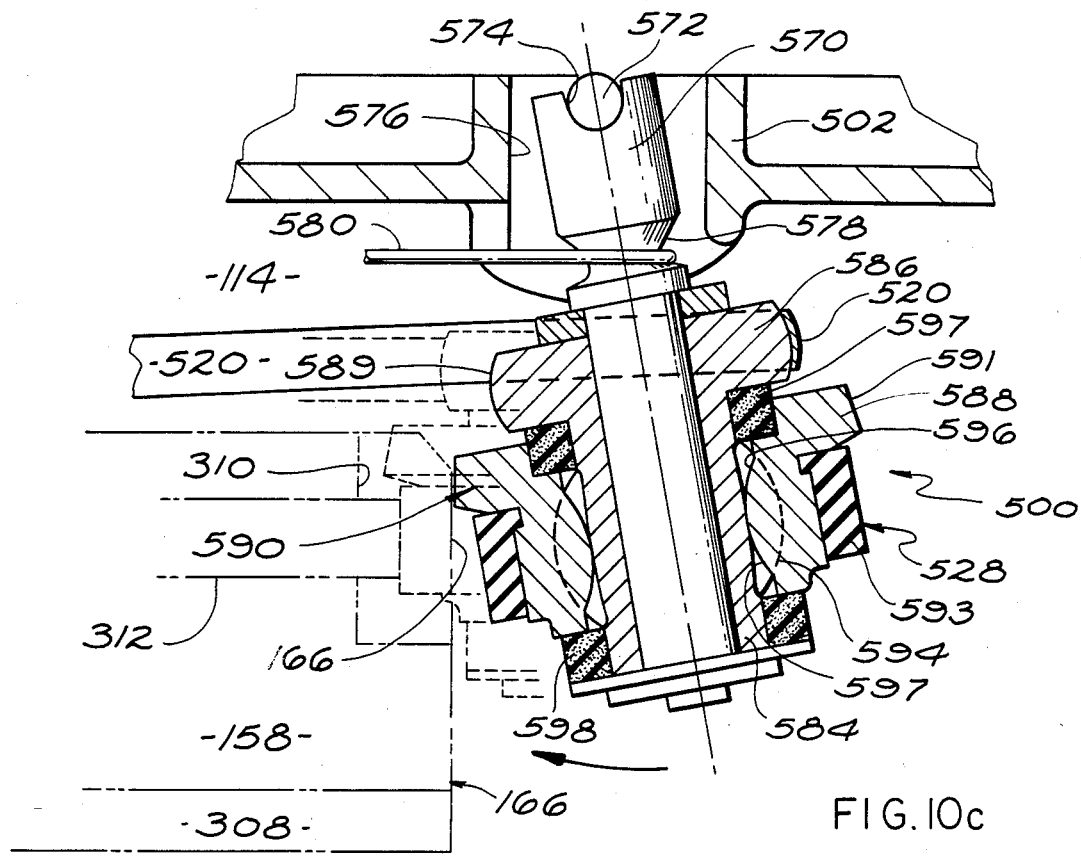
FIG. 10C is a partial cross-sectional front plan view of the tiltable capstan assembly.

The cartridge 158 has a cutaway region 242 along the front edgewall 166 at a location near the first side edgewall 168. As illustrated in FIGS. 7A and 7B, a length of magnetic tape 300 is wound between a first rotatable spool 302 and a second rotatable spool 304, where each spool 302 and 304 are mounted in the cartridge 158. Referring, for example, to FIG. 3B, the cartridge 158 has a top member 306 and a bottom member 308 with the aforedescribed peripheral edgewall 162. As shown in FIG. 10C, the cartridge 158 further has a center opening 310 through which a capstan assembly 500 accesses a drive roller 312. The drive roller 312 is suitably interconnected to the first and second spools 302 and 304 to cause the tape to be wound from one spool to the other in response to rotation of the drive roller 312. The particular capstan assembly 500 incorporated as part of the present invention to drive the drive roller 312 will be described in detail hereafter.

Figure 3C:
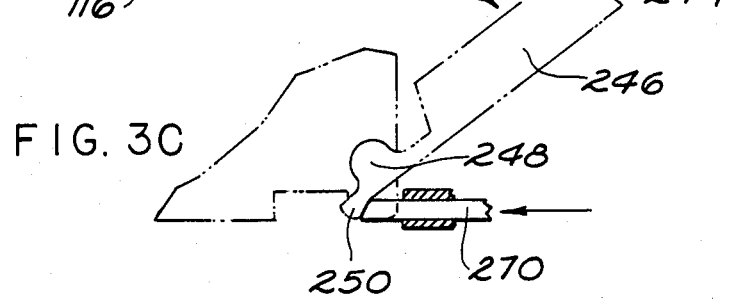
FIG. 3C is a partial top view of the cartridge door illustrating the mechanism by which the cartridge door is opened in response to the door opening mechanism.

Referring, for example, to FIG. 3A, the front edgewall 166 includes the cutaway 242 through which the magnetic tape 300 moves as the magnetic tape is wound between the spools 302 and 304. In general, the cartridge 158 also includes a cartridge door 244 positioned to cover the cutaway 242. The cartridge door 244 generally consists of a closure portion 246 shaped and positioned to cover the cutaway 242 to protect the tape 300 when the cartridge 158 is not engaged with the magnetic head. The closure portion 246 is pivotally connected to the cartridge 158 at a door pivot 248 whereby the cartridge door 244 is pivotally attached to the cartridge 158. Extending from the door pivot 248 in a direction opposite to the closure portion 246 is an actuation portion of flange 250. Upon application of an inwardly directed force against the actuation flange 250 the cartridge door 244 pivots about the door pivot 248 in a clockwise direction causing the closure portion 246 to rotate out of the position in the cutaway 242 thereby exposing the tape 300 in the cutaway 242 as illustrated in FIGS. 3A and 3C.

Referring again to FIGS. 2A, 2D, 3A and 4A, the linkage which enables the engagement lever 116 to effect pivotal movement of the deck includes a connecting flange 172 which is interconnected to or otherwise an integral part of the engagement lever 116 and extends from the main body 174 of the engagement lever into the interior region 114 of the housing 100. A push-pull flange 176, extends outwardly from the main body 174 of the engagement lever 116 away from the interior region 114. The main body 174 of the engagement lever 116 is mounted on a slide rod 178 which extends along the length of the facia member 110. The engagement lever 116 is slidingly mounted on the slide rod 178 to enable the engagement lever 116 to be moved therealong between the latched or engaged position 120 and one of the disengaged positions 122 and 124. A suitable spring 179 is positioned about the slide rod 178 at one end to cushion movement of the engagement lever as it moves to the end of the slide rod 178 toward the engaged position 120.

Extending through the connecting flange 172 is an elongated idle slot 180 oriented generally perpendicular to the slide rod 178. A pivot link 182 is pivotally mounted to the base plate at one end 184 using a suitable connecting pin 186. The interconnection of the pivot link 182 to the base plate 108 is made at a location near the rear 128 of the housing 100. The pivot link 182 extends underneath the deck 150 adjacent the base plate 108 and is interconnected to the connecting flange 172 with a suitable pin 188 which extends upwardly from the other end 190 of the pivot link into the idle slot 180 of the connecting flange 172.

In order to connect the pivot link 182 to the deck 150, a cam slot 192 is provided through the deck 150. The cam slot 192 is an elbow shaped slot defining a generally circular cam escape portion 194 and a generally straight camway portion 196 extending at an angle from the cam escape portion in a direction toward the rear 128 of the housing 100. A cam pin 198 is fixed to a central location of the pivot link 182 between its ends 184 and 190 and positioned to extend upward into engagement in the cam slot 192. As such, the cam pin 198 and the cam slot 192 must be positioned and oriented so that the cam pin 198 extends into the cam slot 192. The radius of the curvature of the cam escape portion 194 is preferably the same as the distance between the connecting pin 186 and the cam pin 198.

In operation, as the engagement lever 116 is moved along the slide rod 178, the first pin 188 will press against one or the other of the elongated sides 181 of the idle slot 180 to cause the pivot link 182 to pivot about the connecting pin 186. As the link 182 pivots, the pin 188 moves longitudinally along the idle slot 180. When the engagement lever 116 is moved into either of the disengaged positions (that is the park position 122 or the eject position 124) the pivot link 182 will rotate about the connecting pin 186 with the cam pin 198 moving along the cam escape portion 198. While the cam pin 198 is moving in the cam escape portion 198, the pivot deck 150 will remain stationary. However, as the engagement lever 116 moves toward the engaged position 120 the cam pin 198 enters the camway portion 196 and begins to press against the edge 200 of the cam way portion 196 causing the pivotal deck 150 to begin to pivot about the deck pivot pin 152. When the engagement lever 116 reaches the fully engaged position 120, the pivot deck 150 will be fully pivoted into the engaged position with the cartridge 158 in a manner to be described hereafter.

The invention also includes a cartridge eject mechanism which includes a first connecting link 202 having an elongated idle slot 204 disposed along a substantial portion of its length. A pin 206 fixed to the connecting flange 172 of the engagement lever 116 and is oriented to extend into the idle slot 204 for interconnecting the connecting link 202 to the engagement lever 116. In the normal movement of the engagement lever 116 between the park position 122 and the engaged position 120, the pin 206 slides in the idle slot 204. Consequently, the first connecting link 202 is not moved in response to movement of the engagement lever 116. However, when the engagement lever is moved from the park position 122 toward the eject position 124, the pin 206 comes in contact with the end 208 of the idle slot 204. Thereafter, further movement of the engagement lever 116 will cause longitudinal movement of the first connecting link 202 in the same direction as movement of the engagement lever 116.

The end 210 of the connecting link 202 opposite the end 208 of the slot 204 is interconnected by a pin 212 to one end 214 of a second connecting link 216. The second connecting link 216 is pivotally mounted to a pivot post 220 fixed to the base plate 108 at a center location thereof. The end 214 of the second connecting link has an idle slot 218 therein to enable the second connecting link 216 to pivot about the pivot post 220. The other end 222 of the connecting link 216 has a pin 224 attached thereto which extends up into an idle slot 226 in one end 228 of a third connecting link 230. The other end 231 of the connecting link 230 is then affixed by a suitable pin 232 to an eject link 234 at one end 236 of the eject link 234. The other end of the eject link 234 opposite the one end 236 has a foot 238 protruding therefrom in a direction toward a cartridge 158 in the interior region 114 of the cartridge tape drive. A suitable spring 239 is interconnected between the link 216 and the first pivot post 220 in a manner so as to urge the connecting link 216 to pivot in a clockwise direction as viewed in FIG. 2A to thereby urge the engagement lever 116 toward the park position 122 after manual movement of the engagement lever 116 to the eject position 124.

In operation, when the engagement lever 116 is moved toward the eject position 124, the pin 206 attached to the connecting flange 172 contacts the end 208 of the slot 204 causing the connecting link 202 to move longitudinally with the engagement lever 116. The pin 212 pulls against the end 214 of the connecting link 216 causing the connecting link 216 to pivot about the first pivot post 220 thereby increasing the tension on the spring 239, as illustrated in FIG. 4A. As the connecting link 216 pivots about the pivot post 220, the pin 224 presses against the side of the slot 226 of the connecting link 230. The pin 232 is preferably attached to the base plate 108 with both the eject link 234 and the connecting link 230 rotatably mounted to the pin 232 in a fixed angular relationship relative to each other. Thus, as the pin 224 moves in the slot 226 in response to pivotal movement about the first pivot post 220, the connecting link 230 and the eject link 234 rotate together about the pin 232 causing the foot 236 to press against the second side edgewall 170 of the cartridge 158 forcing the cartridge 158 from the cartridge insertion port 112.

It will be noted that prior to eject linkage movement, the cam pin 198 will have previously moved down the camway portion 196 pressing against the opposite edge 201 of the camway portion 196 causing the deck 150 to pivot to the disengaged position. While the eject linkage is moving to cause the cartridge 158 to be ejected from the insertion port 112, the cam pin 198 will be in the cam escape portion 198 with the deck in the disengaged position so as not to interfere with the ejection of the cartridge 158.

In accordance with the invention, it will be appreciated that a substantial part of the eject linkages and the pivot linkages will be positioned below the pivot deck 150.

In accordance with the embodiments shown in FIGS. 2A, 3A and 4A the third connecting link 230 is positioned below the deck 150 and the eject link 234 is positioned above the deck 150. Consequently, the eject link 234 and the third connecting link 230 are vertically spaced from one another but attached to the pin 232 in a fixed angular orientation relative to one another. The pin 232 therefore extends from a location below the deck 150 where it is connected to the third connecting link 230 upward through an orifice 241 in the rearmost part of the deck 150. The orifice 241 is sufficiently large and is shaped and oriented so that as the deck 150 is pivoted, the deck 150 will not come in contact with the pin 232.

The eject link 234, the third connecting link 230, the second connecting link 216 and the first connecting link 202 and the associated pins and springs comprise the eject linkage means.

Referring to FIGS. 2B, 2C, 3B and 4B, a cartridge door opening means 253 in accordance with the invention is positioned to engage the engagement lever 116 so that movement of the engagement lever 116 causes the cartridge door 244 to open before the deck 150 pivots to bring the magnetic head assembly 160 mounted on the deck 150 into position to enable a magnetic head 252 (FIG. 2A), which is part of the magnetic head asembly 160, to come into communicating contact with the tape 300 which is exposed in the cutaway 242 as illustrated in FIG. 3A.

The cartridge door opening means includes an angled, boot-shaped, door opening member 254 having a base portion 256 and a top portion 258. The base portion 256 includes a toe flange 260 at one of its ends and a heel flange 262 positioned substantially beneath the top portion 258 at its other end. The toe flange 260 and the heel flange 262 extend from the base portion 256 in a direction opposite to the direction at which the top portion 258 extends from the base portion 256. The topmost end 262 of the top portion 258 is pivotally attached via pin 264 to a downwardly directed flange 266 extending from the top of the housing 100. A door opening pawl 268 interconnected to the engagement lever 116 is positioned to engage the toe flange 260 when the engagement lever 116 is moved in one direction and to engage the heel flange 262 when the engagement lever is moved in the opposite direction.

A door engagement plunger 270 is attached to the top portion 258 of the angled door opening member 254 so that when the angled door opening member 254 pivots about the pin 264, the plunger 170 translationally moves respectively into and out of engagement with the actuation portion 250 of the cartridge door 244 (FIGS. 3A and 3C).

The cartridge door opening means 253 further including an overcenter spring loading means which includes a spring 271 interconnected at one of its ends to a spring connecting flange 272 extending downwardly from the top of the housing 100 and a spring attachment clip 274 on the angled door opening member 254. The spring connecting flange 272, the spring attachment clip 274 and the pivot pin 264 are oriented so that the pin 264 is on one side of the longitudinal axis of the spring 271 when the door opening pawl 268 presses against the toe flange 260 as illustrated in FIGS. 2B and 4B.

In operation, when the engagement lever 116 is in the park position or in the eject position 124, the door opening pawl 268 is freely movable between the toe flange 260 and the heel flange 262 as illustrated in FIG. 2B. The door opening pawl 268 does not engage either the heel flange 262 or the toe flange 260 and hence the angled door opening member 254 is in a fully counterclockwise rotated position and is maintained in that position by the spring 271 since in that position, the pin 264 is either aligned along or is on one side of the longitudinal axis of the spring 271 so that the spring 271 applies a continuous force against the angled door opening member 254 to urge the angled member 254 to rotate in a counterclockwise direction. As the engagement lever 116 is moved out of the park position 122 towards the engaged position 120 as illustrated in FIG. 1, the door opening pawl 268 contacts the toe flange 260 causing the angled door opening member 254 to pivot in a clockwise direction about pin 264 until such time as the longitudinal axis of the spring 271 moves across the pin 264 whereupon the force exerted by the spring 271 urges the angled door opening member 254 to rotate in a clockwise direction rather than a counterclockwise direction. The angled door opening member 254 thereupon snaps into a fully clockwise rotated position as illustrated in FIG. 3B which in turn causes the door engagement plunger 170 to engage the actuation portion 250 of the cartridge door 244 as illustrated in FIG. 3C whereupon the catridge door 244 pivots about the door pivot 248 to cause the closure portion 246 to move away from the cutaway 242 thereby opening the catridge door 244. The spring 271 thereafter maintains the angled door opening member 254 in the fully clockwise rotated position with the plunger 170 continuously pressing against the actuation portion 250 to maintain the catridge door 244 in the open position as illustrated in FIG. 3C.

When the engagement lever 116 is thereafter moved toward the right, the door opening pawl 268 will come in contact with the heel flange 262 when the engagement lever 116 reaches the park position 122 causing the door opening pawl 268 to press against the heel flange 262. The heel flange 262 thereby rotates the angled door opening member 254 in a counterclockwise direction until the spring 271 has moved relative to the pin 264 so that the spring 271 will urge rotation of the angled door opening member in a counterclockwise rather than a clockwise position as illustrated in FIGURE 4B. Thereafter, the spring 271 will maintain the angled door opening member in its fully counterclockwise rotated position as illustrated in FIG. 4B until such time as the engagement lever 116 is again moved from the park position 122 towards the engaged position 120. Of course, as the door opening pawl 268 presses against the heel 262 causing the angled door opening member 254 to rotate about the pin 264 in a counterclockwise direction, the plunger 273 will move longitudinally away from the actuation portion 250 of the cartridge door 244 whereupon the cartridge door 244 will be closable over the cutaway portion 242 upon rotation of the cartridge door 244 about the door pivot 248.

Referring to FIGS. 2A, 3A, 8A and 8B, the deck 150 has a cartridge support surface 280 over which the cartridge 158 slides upon insertion of the cartridge 158 through the cartridge insertion port 112 (FIG. 1). The cartridge support surface 280 of the deck 150 has a center-of-gravity axis which will align along the center-of-gravity axis of the cartridge 158 between the second side edgewall 170 and the first side edgewall 168 of the cartridge 158. Postioned on the center-of-gravity axis 282, and extending up from the cartridge support surface 280, a center of gravity pad (c.g. pad) 284 is preferably positioned to contact the bottom member 308 of the cartridge 158.

In operation, as the deck 150 pivots toward the cartridge 158 with the cartridge 158 in place in the cartridge insertion port 112. The c.g. pad 284 will slide across the bottom member 308 of the cartridge 158 until the deck 150 is in the fully engaged position at which time the c.g. pad 184 will press against the bottom member 308 of the cartridge 158 at the center of gravity of the cartridge 158. As shown in FIG. 8A the cartridge 158 will then be substantially balanced on the c.g. pad 284, thereby minimizing the force required to tilt the cartridge 158 into indexing relationship with the index pin assembly 156 and an index pin assembly 157 to be described hereafter.

In order that the cartridge 158 will slide easily into the cartridge insertion portion 112 and become properly positioned to align on the cartridge support surface 280, the deck 150 further includes a cartridge loading ramp 286 along a forwardly facing edge of the deck 150, i.e., an edge facing the cartridge insertion port 112. The landing ramp 286 is a downwardly tilted ramp positioned to engage the second side edgewall 168 of the cartridge 158 when the cartridge 158 is being inserted into the interior region 114 so as to lift the cartridge 150 up onto the cartridge support surface 280 as the cartridge 158 is inserted.

Referring to FIG. 2D, the cartridge loading ramp 286 will be seen to provide an upwardly sloping ramp to urge the cartridge upwardly so as to slide along the cartridge support surface 280.

Referring to FIGS. 2A and 2E, the present invention includes a cartridge support bridge 290 which includes a slightly ramped surface 292 which is positioned so as to engage the bottom surface 308 of the cartridge 158 adjacent the rear edgewall 164 thereby lifting the rear edgewall to bring the bottom member 308 of the cartridge 158 into substantially horizontal, parallel alignment with the cartridge support surface 280 of the deck 150.

Extending upward from the cartridge support bridge 290 is an offset fulcrum 293 which is positioned to engage the rear edge wall 164 of the cartridge 158 at a location offset from the center line of the lengthwise dimension of the cartridge 158. The offset fulcrum 293 may be of any suitable configuration and may have a cartridge contacting surface 294 which is rounded to facilitate slight pivotal movement of the cartridge 158 over the cartridge contacting surface 294 when the deck 150 comes into engaged relationship with the cartridge 158 in a manner to be described hereafter.

Also extending from the portion of the peripheral frame 102 is a tilt stop member 296 which is positioned adjacent to the rear edgewall 164 of the cartridge 158 adjacent the second side edgewall 170. Extending up from the cartridge support surface 280 of the deck 150 at a location along the second side edgewall 170 immediately adjacent to the rear edge wall 164 is a tilt cam 298.

Figure 12A:
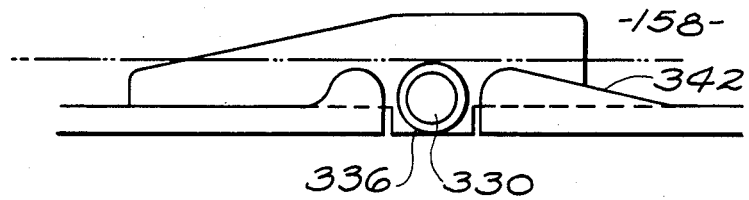
FIG. 12A is a top view of an alternative embodiment of an offset fulcrum.
Figure 12B:
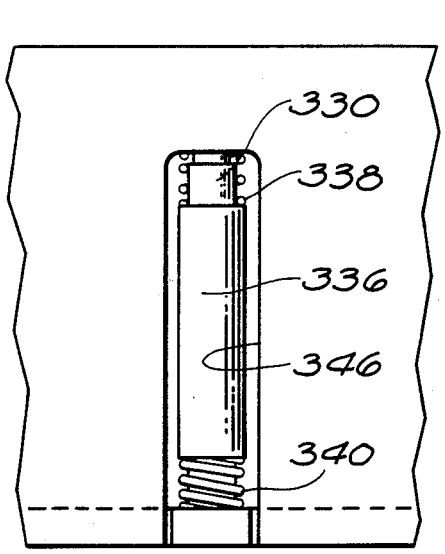
FIG. 12B is a side view of the offset fulcrum of FIG. 12A.
Figure 12C:
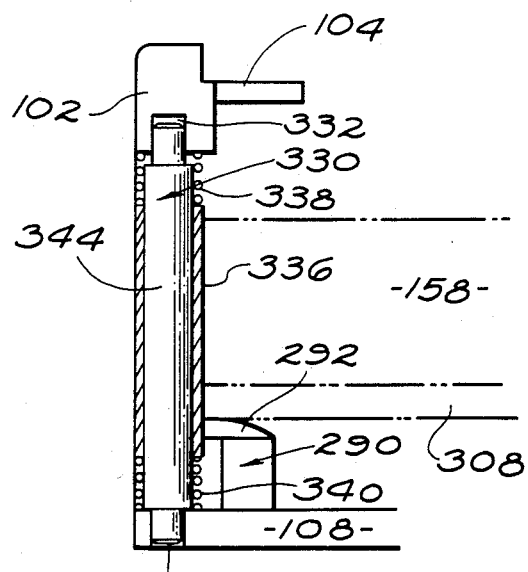
FIG. 12C is a front view of the offset fulcrum of FIGS. 12A and 12B.

Referring to FIGS. 12A, 12B and 12C, one specific alternate embodiment of an offset fulcrum which may be incorporated as offset fulcrum 293 includes a pin 330 mounted between a first orifice 332 extending into a portion of the peripheral frame 102 or a portion of the cover 104 and orifice 334 in the base plate 108 or other suitable portion of the housing 100. Positioned loosely around the pin 330 is a sleeve 336 which is held in a central location along the pin 330 by first balance spring 338 and a second balance spring 340. A vertical ramp 342 is positioned to engage the frontmost corner of the cartridge 158 upon insertion of the cartridge 158 into the insertion port 112 so as to move the rear edgewall 164 into engagement with the surface of the sleeve 336. In the illustrated embodiment shown in FIGS. 12A, 12B and 12C, the pin 330 has two narrowed diameter engagement ends which fit into the respective orifices 332 and 334. The pin 330 further has a central broadened diameter region 344 around which the sleeve 336 is positioned.

In order to accommodate the above described offset fulcrum mechanism, the peripheral frame 102 may have an elongated, vertically oriented slot 346 cut therein. The slot 346 provides a means of accommodating the pin 330 in as narrow a space as possible.

Of course it will be appreciated that other configurations of the offset fulcrum 292 may be used without departing from the broader aspects of the present invention.

Referring to FIGS. 2A, 3A, 8A and 8B, a cartridge indexing mechanism includes the first index pin assembly 156 and the second index pin assembly 157. In order to provide suitable and precise indexing, the cartridge 158 includes a first indexing edge 350 along the front edge wall 166 of the cartridge 158 adjacent the first or front side edgewall 168. Additionally, the bottom member 308 of the cartridge 158 includes an upfacing surface 352. On the upfacing surface 352, immediately adjacent the indexing edge 350 is a first indexing surface 354.

The second index pin assembly 157 is positioned on the deck 150 to engage a second indexing edge 356 along the front edgewall 166 but immediately adjacent the second side edgewall 170 instead of the first side edgewall 178. Immediately adjacent the second indexing edge 356 on the upfacing surface 352 of the bottom member 308 of the cartridge 158 is a second indexing surface 358.

Referring more specifically to FIG. 2A in conjunction with FIG. 8A, the first index pin assembly 156 includes a first hook bracket 360 which extends from and is integral with or otherwise rigidly fixed to the deck 150. The first hook bracket 360 has a downfacing surface 362 which is positioned for contacting the first indexing surface 354 of the cartridge 158 when the deck 50 is in the engaged position. Mounted to the first hook bracket 360 to extend downwardly therefrom is a first index pin 364 around which is mounted an index sleeve 366. An index leaf spring 368 is then mounted around a flange 370 which is part of the deck 150 to press against the downfacing surface 372 of the bottom member 308 of the cartridge 158 opposite the first indexing surface 354.

The second index pin assembly similarly comprises a second hook bracket 374 extending upward from the deck 150 to define a receiving slot between the second hook bracket 374 and the cartridge support surface 280 for receiving the bottom member 308 therein. A second index pin 376 extends downwardly from the second hook bracket 374 and is mounted between the second hook bracket 374 and the cartridge support surface 280 of the deck 150. A second leaf spring 388 is, e.g., mounted to the deck 150 to extend from the cartridge support surface 280 upward toward the downfacing surface of the second hook bracket 374. The second leaf spring 378 is therefore positioned to engage the downfacing surface 372 of the bottom member 308 of the cartridge 158 immediately opposite the second indexing surface 358 of the cartridge 158. The second index pin 386 is positioned to engage the second indexing edge 356. No index sleeve is provided around second index pin 386.

Referring to FIGS. 2A, 2D, 2E, 3A, 7A, 7B, 8A and 8B, the positioning of the cartridge 158 upon insertion into the insertion port 112 and the subsequent indexing of the cartridge 158 relative to the deck may be described as follows. Initially, the cartridge 158 is inserted into the cartridge insertion port 112 with the second side edgewall 170 of the cartridge being inserted first.

As the cartridge 158 is moved into the interior region 114, the bottom member 308 of the cartridge 158 initially comes in contact with the cartridge loading ramp 286 and the cartridge support bridge 290. As the cartridge 158 is further moved into the interior region 114, the downfacing surface 372 of the bottom member 308 moves along the cartridge loading ramp 286 and the cartridge support bridge 290 causing the second side edgewall 170 to move upwardly until the bottom member 308 is essentially parallel with and sliding over the cartridge support surface 280. At the same time, the rear edgewall 164 of the cartridge 158 contacts the cartridge contacting surface 294 of the offset fulcrum 292 with the c.g. pad 284 thereafter pressing upwardly to cause the cartridge to tilt slightly up and way from the cartridge support surface 280 as illustrated in FIG. 8B. The cartridge 158 is thereafter further inserted into the interior region until the second side edgewall 170 adjacent the rear edgewall 164 contacts the tilt cam 298 at which point, the cartridge 158 will be fully inserted.

The engagement lever 116 is thereafter moved from one of the disengaged positions 122 or 124 toward the engaged position 120 thereby causing the deck 150 to pivot about the pivot pin 152. Upon pivotal movement of the deck 150, the tilt cam 298 moves along the second side edgewall 170 urging the cartridge 158 to pivot about the cartridge contacting surface 294 of the offset fulcrum 293 until the rear edgewall 164 contacts the tilt stop member 296.

A drive capstan 528 on a capstan assembly 500, shown in FIGS. 5B, 5C and 10C and to be described more fully hereafter, contacts the cartridge drive roller 312 further pressing the cartridge into contact against the tilt stop member 296 and the offset fulcrum 293 as illustrated in FIG. 7A. At this juncture, the first and second index pin assemblies 156 and 157 are not in indexing relationship to the first and second indexing edges 350 and 356, respectively. However, upon further pivotal movement of the deck 150 into the fully engaged position, the sleeve 366 around first index pin 364 will initially contact the first indexing edge 350 with the leaf spring 368 urging the cartridge 158 to tilt upwardly so that the first indexing surface 354 is in contacting relationship against the downfacing surface 362 of the first hook bracket 360 as shown in FIG. 8A. The strength of the leaf spring 368 need not be great since the c.g. pad 284 will have moved to the center of gravity of the cartridge 158 and only slight force is thereby required to tilt the cartridge about the c.g. pad 284.

As the deck 150 pivots further, the index sleeve 366 of the first index pin 364 slides or rolls a small distance along the first indexing edge 350 until the second index pin 376 contacts against the second indexing edge 356 of the cartridge 158. The second leaf spring 378 similarly presses against the downfacing surface 372 of the cartridge 158 causing the second indexing surface 358 to press up against the downfacing surface of the second hook bracket 374 in a manner similar to that shown in FIG. 8A.

As the index sleeve 366 moves slightly along the first indexing edge 350 before the second index pin 376 contacts the second indexing edge 356, the first index pin assembly 156 causes the cartridge 158 to pivot slightly about the offset fulcrum 293 causing the rear edgewall 164 of the cartridge 158 to move away from the tilt stop 296 as illustrated in FIGS. 2A and 7B.

Thus, the cartridge will be precisely positioned by the index sleeve 366, the second index pin 376 and the offset fulcrum 293. At the time that the indexing pins 364 and 376 come in contact with the respective indexing edges 350 and 356, the pivotal movement of the deck 150 further causes the tilt cam 298 to move out of contact with the second side edgewall 170 of the cartridge 158 as illustrated in FIG. 7B, further allowing for the slight pivotal movement of the cartridge into proper indexing relationship against the respective pins and the offset fulcrum 293.

Vertical alignment is assured as illustrated in FIGS. 8A and 8B by the c.g. pad 284 which, in conjunction with the leaf springs 368 and 378 (FIG. 2A), allows the cartridge 158 to be tilted by the leaf springs 368 and 378 about the c.g. pad 284. Thus, the cartridge 158 is precisely horizontally positioned with the front edgewall pressing against the first and second index pins 364 and 376 and the offset fulcrum 293 pressing against the rear edgewall 164 and vertically positioned with the first and second indexing surfaces 354 and 358, respectively, pressing against the downfacing surface of the respective first and second hook brackets 360 and 374 with the downfacing surface 372 of the cartridge precisely positioned by the c.g. pad 284.

It is a particularly significant aspect of the present invention that the index pins, the downfacing surfaces of the respective hook brackets and the c.g. pad all have a predefined, fixed, immovable relationship to one another and all are either a part of or fixed to the deck 150 so that misalignment of these essential indexing members cannot occur.

Referring to FIGS. 2A and 3A, the pivotal deck 150 may include an over-center spring loading system 400 for biasing the deck 150 to move into and remain in either the engaged or disengaged positions upon movement of the deck respectively toward the engaged or disengaged positions. More specifically, the over-center spring loading system 400 comprises a first base plate pin 402 which is mounted to the base plate 108 to extend upwardly toward the deck 150. A generally triangular cutout 404 is cut through the deck 150 to provide clearance for the pin 402 when the deck 150 pivots between the engaged and the disengaged positions. A second base plate pin 406 similarly extends upward from the base plate 108 at a second location spaced from the first pin 402. A second cutout 408 is similarly provided through the deck 150 to likewise allow for clearance of the pin 406 upon pivotal movement of the deck 150. The cutouts 404 and 408 are preferably of a generally triangular shape. A first trip spring 410 is then interconnected at a first end to a first deck location 412 and a second end is attached to the first base plate 402. A second trip spring 414 is similarly connected at a first end to a second deck location 416 with its other end connected to the pin 406.

As seen in FIG. 2A, as the deck 150 pivots, the cutouts 404 and 408 in the deck move relative to the pins 402 and 406 causing the tension in the springs 410 and 414 to intially decrease until an intermediate position in the pivotal movement of the deck is reached and thereafter to again increase as the deck is further moved, for example, into the engaged position as shown in FIG. 3A. Hence, when the pivotal deck 150 is in the fully disengaged position, the springs 410 and 414 will urge the deck 150 into the disengaged position. On the other hand, when the deck is pivoted into the engaged position, the springs 410 and 414 will similarly urge the deck to remain in the engaged position. The above described over-center loading system thus assures that the deck 150 will remain in the engaged position even in a vibration environment or when the cartridge tape drive in accordance with the invention is moved such as when it is twisted, rotated or otherwise experiences a position change while the cartridge is in position in the insertion port.

Referring to FIG. 7B, the data cartridge tape drive may further incorporate a suitable engaged position detection circuit 440 which is coupled between the index sleeve 366 and the second index pin 376. If the base plate 308 of the cartridge 158 is electrically conductive or there is otherwise a signal conduction path between the first and second indexing edges 350 and 356, respectively, of the cartridge 158, then by incorporating a suitable detection circuit 440, well known in the art, a lamp or other indicator 442 will give the operator a positive indication and confirmation that the cartridge 158 is, indeed, positioned in the engaged position and is ready for the reading or writing of data.

As previously indicated, the housing 100 for the data cartridge tape drive includes a base plate 108, a peripheral frame or case 102 and a cover member 104. The cover member 104 may, in one embodiment, be a printed circuit board with the electrical components facing down into the interior region 114 of the cartridge tape drive mechanism 90.

Referring to FIGS. 2D, 5A, 5B, 8A, 8B, 10A and 10B, the present invention preferably includes a rigid bridge member 502 which is between opposite sides of the peripheral frame 102 to extend parallel to the facia member 110 at a region between the facia member 110 and the rear 128 of the housing 100. Extending down from the bridge member 502 at a location which will substantially align with the center-of-gravity 501 of the cartridge 158 when that cartridge 158 is inserted and fully engaged with the deck 150 in the fully engaged position, is a ball retaining member 508 with a ball 506 inserted therein. A ball retaining orifice 504 extends through a retaining member 508 which is narrowed at its end adjacent the cartridge 158 so the ball 506 is held in the retaining orifice 504.

As shown in FIG. 5B, a spring 512 is positioned to press the ball 506 downwardly into the orifice 504 and against the top 306 of the cartridge 158.

Turning to FIGS. 8A and 8B, in the preferred embodiment, the positioning of the ball 506 is such as to align vertically with the c.g. pad 284 when the deck 150 is in its fully engaged position. The spring 512 then forces the ball 506 against the top 306 of the cartridge 158. Hence, the data cartridge tape drive 90 can be tilted, rotated, or otherwise moved without causing the cartridge 158 to move or become disengaged from the tape drive. The retaining member 508 with the ball retaining orifice 504 extending therethrough, the ball 506 and the spring 512 comprise the means for pressing against the top of a cartridge 158 whereby the cartridge 158 may be held in a preselected position in the housing 100 when the deck 150 is in the engaged position. In accordance with the invention, the positioning of the ball 506 is preferably at the center-of-gravity of the cartridge or at the least, along a center axis of the cartridge 158.

Figure 5A:
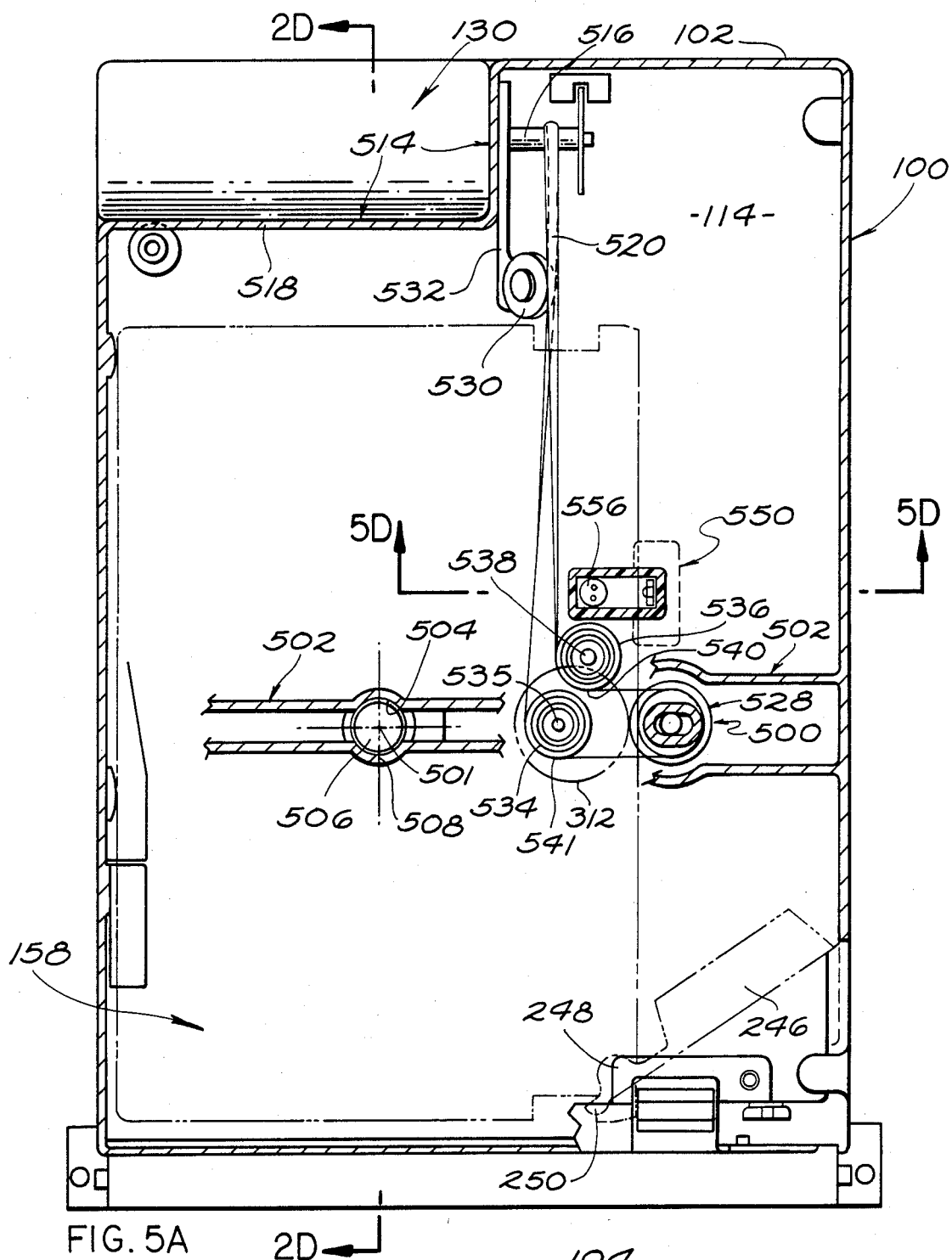
FIG. 5A is a top view of the cartridge tape drive accordance with the invention illustrating the drive mechanism whereby the drive roller of the cartridge is rotated to cause movement of the magnetic tape in the cartridge.

Referring to FIG. 5A in conjunction with FIG. 2D, the housing 100 has a concavity 514 along at least a portion of the rear 128 of the housing 100 remote from the facia member 110. Positioned in the concavity 514 is a drive motor 130 having a rotatable drive shaft 516 which extends through the peripheral frame 102 into the interior region 114 of the housing 100. Positioned in the indenture or concavity 514 between the interior 114 and the drive motor 130 is an insulation member 518 which preferably is a ceramic member. The insulation member 518 minimizes the transfer of heat generated by the drive motor 130 into the interior region 114 of the housing 100.

Referring to FIG. 5A, a drive belt 520 extends around the drive shaft 516 of the drive motor 130 whereby rotation of the drive shaft 516 causes translational movement of the drive belt 520. In accordance with the invention, drive belt 526 extends around a drive capstan 528 which contacts the drive roller 312 in the cartridge 158 when the deck 150 is in the engaged position to cause movement of the magnetic tape 300 inside the cartridge 158 as illustrated in FIG. 7B.

In order for the drive belt 520 to effect rotation of the drive capstan 528, an oblique idler 530 is rotatably mounted to an idler flange 532 which in turn is mounted to the housing 100. The oblique idler 530 aids in twisting the drive belt 520 from a vertical orientation as it passes around the drive shaft 576, to a generally horizontal orientation as it passes around the drive capstan 528. Thus rotation about the horizontal rotation axis of the drive shaft 516 is converted to rotation about the vertical rotation axis of the drive capstan 528.

The data cartridge tape drive 90 in accordance with the invention further comprises a first idler 534 rotatably mounted to a first idler axle 535 mounted to the bridge member 502 and a second idler 536 similarly rotatably mounted to a second idler axle 538 mounted to the bridge member 502. The first idler 534, the second idler 536 and the drive capstan 528 all rotate about spaced apart, parallel, vertical axes.

By way of summary therefore, the drive belt 520 passes around the drive shaft 516, contacts the oblique idler 530 where it is twisted into a horizontal plane, passes around the inside 540 of the second idler 536, around the periphery of the drive capstan 528, back around the outside 451 of the first idler 534 and back around the drive shaft 516. The oblique idler 530, the drive belt 526, the first idler 534, the second idler 536 and the capstan assembly 500 comprise the means for rotating the drive capstan 528 in accordance with the invention.

Figure 5D:
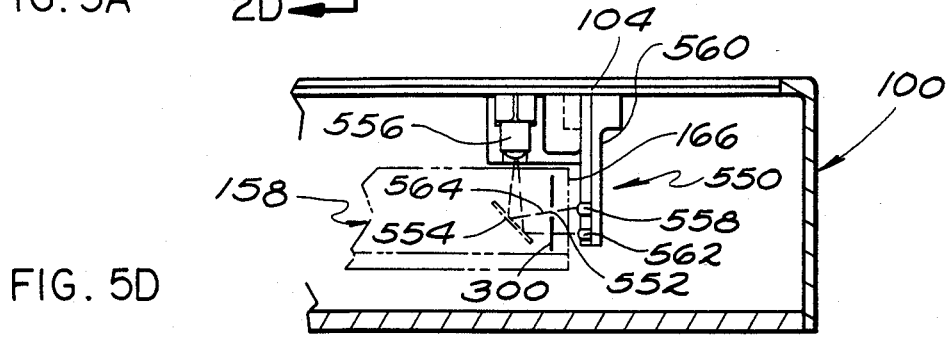
FIG. 5D is a partial cross sectional front view of the end of tape/beginning of tape sensor mechanism in accordance with the invention.

Referring to FIG. 5D, cartridges 158 for use in a tape drive in accordance with the invention, generally have an end of tape/beginning-of-tape sensor system (EOT-BOT sensor) 550. In order to enable an external sensor to detect the beginning and the end of the tape, the magnetic tape 300 in the cartridge 158 has holes 552 punched therein and an angled reflecting member 554, such as a mirror. In accordance with the sensor incorporated in the present invention, a high output gallium aluminum arsenide emitter 556 or other suitable emitter member is mounted to the circuit board comprising the cover 104 of the housing 100. The emitter 556 is positioned in alignment with the reflecting member 554 when a cartridge 158 is in the engaged position in the interior 114 of the housing 100. A first sensor member 558 and a second sensor member 562 are positioned in vertically spaced relationship to each other on a flange member 560 which extends downward from the circuit board 104. The flange member 560 is positioned to extend down along the side of the cartridge 158 so as to be adjacent to the front edgewall 166 of the cartridge 158. The sensor 558 is positioned vertically along the flange 560 so that when the orifice 552 in the magnetic tape 300 passes in front of the sensor 558, the light 564 from the emitter 556 will reflect off of the reflecting member 554 through the orifice 552 and will be sensed by the sensor 558 thus indicating, for example, the beginning of the magnetic tape 300.

If, on the other hand, light from emitter 556 passes through an orifice (not shown) in the tape 300 and is sensed by the sensor 562, then that will indicate, for example, that the end of the tape has occurred. Suitable electrical connections may be made to sensor 558 and 562 to cause the drive motor, for example, to stop or effect other control as desired upon the beginning or the ending of the tape.

Turning to FIGS. 5B, 5C, 10A, 10B and 10C, the capstan assembly 500 in the preferred embodiment, includes a capstan axle 570 fixed at one end to a pin 572 in a generally "T" shaped orientation. The pin 572 is positioned in a slot 574 which extends across the bridge member 502 in a direction which extends between the facia member 110 and the rear 128 of the housing 100. A generally oblong orifice 576 extends through the bridge member 502 with the capstan axle 570 extending through the oblong orifice 576 into the interior 114 of the housing 100. The pin 572 is pivotal in the slot 574 so that the entire capstan assembly 500 can pivot in a pendulum-like motion in the slot 574.

The capstan axle 570 shown in FIGS. 10C may further includes a narrowed region 578 around which is mounted a tension spring 580. The other end of the tension spring 580 is mounted to a suitable flange 582 extending down from the bridge member 502. The spring 580 urges pendulum-like movement in a direction toward the tape cartridge 158 to assure that the drive capstan 528 will press against the drive roller 312 in the cartridge 158 to assure that the magnetic tape 300 will rotate in response to rotation of the drive capstan 528.

Alternatively, as shown in FIGS. 5B and 5C, the tension spring may be eliminated with the drive belt 520 exerting sufficient force to urge the drive capstan 528 against the drive roller 312.

Figure 9:
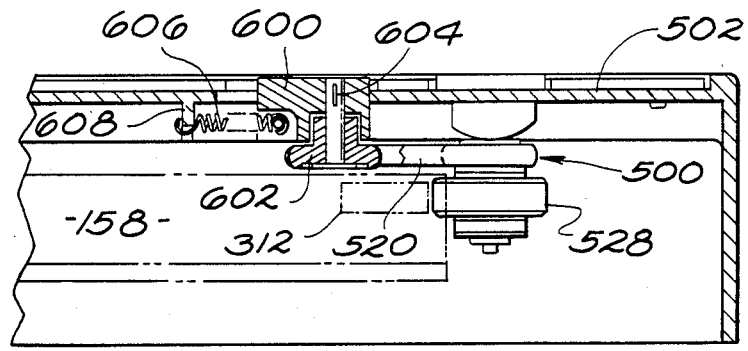
FIG. 9 is a partial cross-sectional side plan view of one embodiment of the capstan assembly in accordance with the invention.

Referring to FIG. 9, another alternative embodiment of the means for urging the drive capstan 528 into contacting engagement with the drive roller 312 is illustrated as comprising a slidable member 600 slidingly mounted to the bridge member 502. A suitable idler 602 around which the drive belt 520 passes is then rotatably mounted to an axle 604 which is fixed to the slidable member 600 to slide therewith. A tensioning spring 606 is interconnected between a bridge flange 608 and the slidable member 600 to urge the slidable member 600 in a direction away from the capstan assembly 500. The drive belt 520 then passes around the idler 602 with the belt 520 urging the drive capstan 528 against the drive roller in the cartridge. In the preferred embodiment, the drive belt 520 used in conjunction with the embodiment shown in FIGS. 9; 5B or 5C; or 10A, 10B and 10C, comprises any suitable non-stretchable belt and may, for example, be a spun cast hytrel belt to provide 16 to 22 ounces of capstan loading for a bidirectional drive. Of course suitable tensioning could be effected by a stretchable drive belt which is stretched around the various idlers and around the drive capstan to urge the drive capstan to press against the drive roller in the cartridge.

Referring again to FIG. 10C, the capstan assembly 500 further comprises a capstan core 584 which is rotatably mounted on the capstan axle 570. A drive disc 586 is positioned above the drive capstan 528 and is fixed for rotating with the capstan core 584. In accordance with the invention, the drive belt 520 extends around the periphery of the drive disc 586 to effect rotation of the capstan core 584 and hence the drive capstan 528. The periphery of the drive disc 586 has an axially curved surface. As previously indicated, the belt 520 may be either a stretchable belt or a nonstretchable belt but in any event must be tightly mounted around the various drive discs and idlers.

In the embodiment illustrated in FIG. 10C, the drive capstan 528 includes a rim member 588 interconnected to the capstan core 584 for rotating with the capstan core 584. The rim member 588 includes an outwardly extending annular abutment shoulder 590 which has an outer surface 591 which slants radially inwardly from its bottom nearest the drive capstan to the top nearest the drive disc. Extending radially inwardly from the topmost edge of the abutment shoulder 590 is a radial surface 592 which extends well beyond the outer diameter of the drive disc 586. The annular radial surface 592 is immediately below the outermost axially curved surface 589 of the drive disc 586.

In order to mount the rim member 588 to the capstan core 584, the capstan core has a plurality of axially directed longitudinal splines 594 which protrude outwardly in a generally concave configuration from the capstan core 584. The rim member 588 has a toroidal shape with a cylindrical inside surface 596 having a central annular convexity 597 (which may also be splines) protruding into contact with the plurality of splines 594. Consequently, the splines 594 press against the inside convexity 597 of the rim member 588 so that the rim member is fixed to the capstan core 584 to rotate therewith. In one embodiment, the inside surface 596 may likewise have an annular axially disposed concavity and may be splined to intermesh with the splines 594 of the capstan core 584.

In order to provide for cushioning and to enable some tiltable movement of the drive capstan 528 relative to the capstan core 584, a bottom resilient washer 598 is positioned between the bottom of the drive capstan 528 and a large diameter washer affixed to the capstan core 570 to hold the capstan assembly 500 on the core 570. Another resilient washer 597 is positioned between the top of the rim member 588 and the bottom of the drive disc 586. The resilient washers 597 and 598 may for example be reticulated foam or any other resilient, compressible material which will permit slight tiltable movement of the drive capstan 528, including the rim member 588, relative to the capstan core 584.

Figures 11A, 11B:
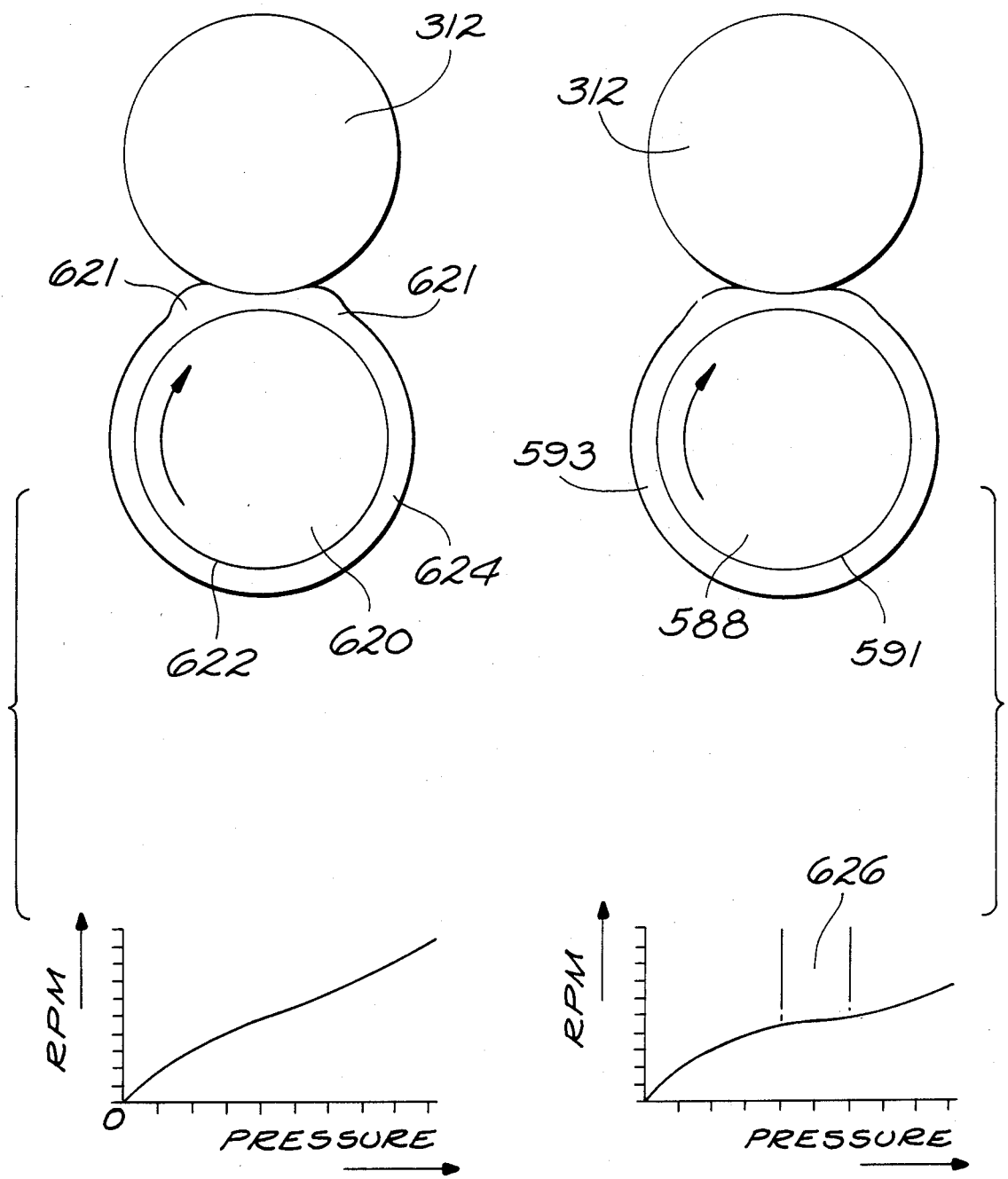
FIG. 11A is a graphical illustration of the effect which occurs with prior art molded tire on the drive capstan.
FIG. 11B is a graphical illustration of the effect which occurs with a stretched tire on the drive capstan.

The drive capstan 528 finally includes a drive tire 593 which is stretchably mounted about the outer annular surface 591 of the rim member 588. Referring to FIG. 11A, prior art drive capstans generally included a rim member 620 having an outer surface 622 on which was mounted a drive tire 624. The drive tire was, injection molded or premanufactured in a suitable manner and then affixed to the outer surface 622 in a non-stretched configuration. As such drive tires rotated, they deformed slightly before and after the region of contact with the drive roller 312 in the cartridge as illustrated by the bulges 621. As shown in the graph of FIG. 11A, non-stretched tires resulted in a continuous variation in capstan speed in response to variations in the force with which the drive capstan pressed against the drive roller 312. This was undesirable and resulted in imprecision.

It has been determined, however, that if a tire is made to be stretched around the outer surface of the rim member as illustrated in FIG. 11B, that speed variations will be largely eliminated over a range of force values, resulting in an essentially flat spot 626 as illustrated in the graph of FIG. 11B. This is a desirable condition to enable greater tolerances in the manufacture of the tape drive and to effect greater precision in reading onto a magnetic tape, reading from a magnetic tape and providing greater data storage onto the magnetic tape.

Hence, the present invention comprises a drive tire 593 which is stretched around the outer surface 591 of the rim member and remains in a stretched configuration. It is this stretched drive tire 593 that then makes actual contact with the drive roller 312 in the cartridge.

Referring again to FIG. 10C, in operation, when the cartridge 158 is inserted into the interior 114 of the housing 100, the top, front corner region of the cartridge 158 between the second side edge wall 170 and the front edge wall 166 will first contact the annular abutment shoulder 590 of the capstan assembly 500 causing the capstan assembly 500 to pivot away from the cartridge 158 as illustrated by the solid lines in FIG. 10C. As the cartridge 158 is further inserted, the capstan assembly 500 will remain in its tilted away position with the surface 591 of the abutment shoulder 590 contacting the front edgewall 166 along the region adjacent to the top of the cartridge 158 until the cartridge 158 has been inserted a sufficient distance to cause the capstan assembly 500 to be adjacent to the opening 310 in the center of the cartridge 158 which provides access to the drive roller 312. At that juncture, the abutment shoulder 590 will no longer be forced outwardly by the top edge of the cartridge 158 thereby allowing the tensioning spring 580 to pivot the capstan assembly 500 into contact with the drive roller 312 as illustrated by the dashed lines in FIG. 10C. The tensioning spring 580 will thus cause the outer surface of the drive tire 593 to come in contact with the drive roller 312 with the tensioning spring 580 preset in conjunction with the tension of the belt 520 to urge the drive tire to press against the drive roller 312 with a predefined amount of force which will preferably be in the flat part of the curve as shown in FIG. 11B.

While the capstan assembly 500 is in the tilted away position (shown in solid lines in FIG. 10C) it will be seen that movement of the drive belt 520 about the drive disc 586 will cause the drive belt 520 to move downward toward the radial surface 592. The radial surface 592 thus provides a means of maintaining the drive belt 520 in position on the outer surface 598 of the drive disc 586 by preventing downward movement of the belt 520 off of the outer surface of the drive disc 586. Of course, once the capstan assembly 500 pivots into engagement with the drive roller 312, the belt 520 will again be horizontally aligned with the surface of the drive disc 586 and the possibility of movement of the belt 520 off the drive disc 586 will be substantially eliminated.

Referring to FIGS. 2A, 6A, 6B, 6C, 6D, 6E and 6F, the magnetic positioning assembly 160 comprises a stepper motor 154 mounted to the upfacing surface 702 of an overthrust portion 704 of the pivotal deck 150. The overthrust portion 704 of the pivotal deck 150 extends up from the plane of the cartridge support surface 280 along the edge of the pivotal deck 150 adjacent the front edge 166 of the cartridge 158. The stepper motor 154 includes a drive axle 706 which extends downward through an orifice 708 through the overthrust portion 704 of the pivotal deck 150 immediately below the region where the stepper motor 154 is mounted. Attached to the drive axle 706 is a worm gear 710. In the embodiment illustrated in FIG. 6A, the worm gear 710 is provided with a convex outer surface.

Mounted below the overthrust portion 704 of the pivotal deck 150 is a transfer beam 712. In the preferred embodiment, the transfer beam 712 is sintered in bronze and includes a first end 713 with a taut wire assembly 714 mounted thereto and a second end 715 to which is mounted a suitable parallel flexure member 716 to be described hereafter. The taut wire assembly 714 comprises a U-shaped taut wire mounting member 718 where the U-shaped member 718 has an indenture 720. A taut wire 722 is then positioned around the U-shaped member 718 across the mouth of the indenture 720 and is held in tension by a suitable tension spring 724. The spring 724 is held against the back of the U-shaped member 718 with the taut wire 722 attached to each end of the tension spring 724 and extending around the U-shaped member 718.

The worm gear 710 is positioned in the indenture 720 with the taut wire engaging the threads of the worm gear 710 on the side of the worm gear facing outwardly from the indenture 720. Hence, the worm gear 710 will be positioned in the indenture 720 between the innermost part of the indenture 720 and the taut wire across the mouth of the indenture 720.

The transfer beam 712 is pivotally mounted to the underside of the overthrust portion 704 by a suitable knife-edge fulcrum assembly 730. Referring to FIG. 6F, a knife-edge fulcrum member 732 is mounted to extend downwardly from the overthrust portion 704 toward the cartridge support surface 280. The transfer beam 712 is provided with a longitudinal fulcrum groove 734 into which the point of the knife-edge fulcrum 732 extends and nests. A fulcrum loading spring 736 is attached between a pin 738 on the transfer beam 712 and a pin 740 on the overthrust portion of the pivotal deck 704. The fulcrum loading spring 736 is a tension spring which pulls the transfer beam 712 upwardly against the knife-edge fulcrum 732 thereby maintaining the knife-edge fulcrum 732 in the fulcrum groove 734.

In order to balance the load borne by the end of the transfer beam 712 opposite the taut wire assembly 114, a counterweight 742 having a predefined weight is affixed to the transfer beam 712 at a preselected location between the taut wire assembly 114 and the fulcrum groove 734 so as to balance the weight on the transfer beam 712 on either side of the fulcrum groove 734. The beam loading spring 742 will thus cause the taut wire 722 to press against the upfacing surface of the teeth of the worm gear 710. In the particular embodiment illustrated, the counterweight 742 extends up through an orifice 746 in the overthrust portion 704.

In order to load the taut wire 722 against the worm gear 710, a beam loading spring 742 is positioned in compression between the downfacing surface of the overthrust portion 704 and the top of the transfer beam 712 generally adjacent to the counterweight 742.

Referring to FIGS. 6C, 6D and 6E, the parallel flexure 716 includes a head mounting end 770 having a head mounting surface 772 on which the magnetic head 252 is mounted. The parallel flexure 716 further has a deck mounting end 774 with a deck mounting surface 776 which is fixed to the underside of the pivotal deck 150. Interconnected between the head mounting end 770 and the deck mounting end 774 is a first beam 778 and a second beam 780. The first beam 778 has a first rounded end 784 which is nested in a first groove 782 formed in a flange 798 extending up from the deck mounting edge and further has a second generally rounded end 786 which is similarly nested in a rounded trough groove 788 formed in a flange 800 extending up from the head mounting end 770 as illustrated in FIG. 6E. The second beam 780 similarly has a pair of conically shaped, rounded ends 790 and 792, respectively, which are nested in rounded trough grooves 794 and 796, respectively. The first and second beams 778 and 780 thus extend between vertically extending flanges 798 and 800, respectively, of the deck mounting end 774 and the head mounting end 770 of the parallel flexure 716.

A tension spring 802 is connected around the vertical members 798 and 800, respectively, to retain the first and second beams 778 and 780 in position in their respective grooves 784, 788, 794 and 796.

In accordance with the invention, a groove 804 is provided in the lower portion of the head mounting portion 770. An indenture 806 is then provided in the top of the head mounting portion 770 opposite the groove 804. The end 715 of the transfer beam 712 is then interconnected to the parallel flexure 716 by a trapeze ring 808 which extends around the end 715 of the transfer beam 712 and under the groove 804. A beam loading spring 812 is then positioned in the indenture 806 and in a similar downfacing indenture 814 in the end 715 of the transfer beam 712. The beam loading spring 812 is placed in compression to maintain the trapeze ring 808 in a taut condition.

In operation, as the stepper motor 700 rotates, the worm gear 710 rotates causing the end 713 of the transfer beam 712 to move along the worm gear 710 and thereby pivot about the knife-edge fulcrum 732. As the end of the transfer beam 712 moves down the worm gear 710, the opposite end 715 of the transfer beam pulls up on the parallel flexure 716 causing the head mounting end 770 to move upwardly. However, because the first and second beams 778 and 880, respectively, are in fixed separated distance from one another and because the deck mounting end 774 is in fixed relationship to the deck and does not move, the top surface 772 will move vertically upwardly always remaining parallel to the surface 776, thereby assuring precise vertical movement of the head 252 relative to the tape in response to rotation of the worm gear 710.

Referring to FIG. 6D, it will be appreciated that the spring 802 is attached in such a manner as to maintain the balance of the parallel flexure 716. In one embodiment, the spring 802 is provided to apply approximately a one pound load to the first and second beams 778 and 780.

It will of course be appreciated that various modifications and alterations in the above specifically described embodiment can be made without departing from the spirit of the invention. For example, the worm gear 710 may be provided with a concave outer surface rather than a convex outer surface in which event the worm gear would not be positioned in an indenture with the taut wire pulled against the outer surface of the worm gear but would be placed outside the indenture with the taut wire pushed against the outer surface of the worm gear. It will also be appreciated that the radius of curvature of the worm gear 17 is substantially the same as the distance between the point of the knife-edge fulcrum 732 and the taut wire at the point where it passes across the opening of the indenture 720.

Various other modifications and changes in the above described specific embodiments are also possible without departing from the spirit of the invention and all such changes, alterations and modifications are intended to be a part of this invention.

What is claimed is:

1. A data cartridge tape drive for receiving a cartridge, the cartridge having a magnetic tape therein and a front edgewall with a door in the front edgewall of the cartridge, said door being selectively openable to allow access to the magnetic tape therein for writing and reading onto the magnetic tape, the cartridge further having a side edgewall, the cartridge tape drive comprising:

a housing with a baseplate extending generally along a first plane and having a cartridge insertion port for receiving the cartridge thereunto, side edgewall first, the cartridge thereafter remaining substantially stationary until removed through the carriage insertion port;

a deck mounted to the baseplate and pivotal in a plane generally parallel to the first plane between an engaged position and a disengaged position the deck positioned for engaging and aligning the substantially stationary cartridge upon pivotal movement into the engaged position;

a magnetic head fixedly mounted on the deck for pivotal movement therewith;

an engagement level coupled to the deck for movement of the deck between the engaged and disengaged positions in response to movement of the engagement lever, the magnetic head being brought into data communicating relationship to the magnetic tape in the cartridge when the deck is pivoted into the engaged position.

2. The cartridge tape drive of claim 1 wherein the deck has an elbow shaped cam slot therein defined by a cam-escape portion and a camway portion, the engagement lever having an idle slot therein, the cartridge tape drive further comprising:

a pivot link having one end pivotally pinned to the base plate, and having another end with a first pin affixed to the other end and interconnected in the idle slot of the engagement lever for pivoting the pivot link about the one end in response to translational movement of the engagement lever; and a cam pin affixed to extend from the pivot link at a position for engaging the cam slot in the deck, the cam pin being movable along the cam escape portion of the cam slot in response to pivotal movement of the pivot link about its one end caused by translational movement of the engagement lever, the deck pivoting only in response to movement of the cam pin into and along the camway portion of the cam slot in response to pivotal movement of the pivot link about its one end caused by translational movement of the engagement lever.

3. The cartridge tape drive of claim 2 wherein the engagement lever comprises:

a push/pull flange positioned for being grasped by a user to effect translational movement of the engagement lever; and a connecting flange positioned for being grasped by a user to effect translational movement of the engagement lever; and a connecting flange having an idle slot therein; the cartridge tape drive further comprising:

a first pin affixed to the other end of the pivot link, the first pin positioned to translationally move along the idle slot of the connecting flange of the engagement lever;

a facia member immovably positioned along one edge of the baseplate; and a slide member positioned along the facia member, the engagement lever mounted to the slide member for sliding therealong.

4. A data cartridge tape drive having a cartridge insertion port for receiving a cartridge, the cartridge having a magnetic tape therein and a front edgewall with a door in the front edgewall of the cartridge, said door being selectively openable to allow access to the magnetic tape therein for writing and reading onto the magnetic tape when the cartridge is inserted in the insertion port; the cartridge further having a side edgewall for being inserted into the insertion port, the cartridge tape drive comprising:

a housing with a baseplate extending generally along a first plane;

a deck mounted to the baseplate and pivotal between an engaged position and a disengaged position;

a magnetic head mounted on the deck for pivotal movement therewith;

an engagement lever coupled to the deck for movement of the deck between the engaged and disengaged positions in response to movement of the engagement lever, the magnetic head being brought into data communicating relationship to the magnetic tape in the cartridge when the deck is in the engaged position; and cartridge indexing means fixed to the deck for pivotal movement therewith, and for registration of the deck with the front edgewall of the cartridge along a plane substantially parallel to the first plane upon movement of the deck into engagement with the cartridge.

5. The cartridge tape drive of claims 1, 2, 3, or 4 wherein the deck has a top side and a bottom side opposite the top side wherein the top side defines a cartridge support surface over which the cartridge slides upon insertion and ejection of the cartridge from the insertion port.

6. The cartridge tape drive of claim 5 further comprising:

a raised cartridge support pad extending from the cartridge support surface and positioned for tilting the front edgewall of the cartridge up and away from the cartridge support surface when the deck is in the disengaged position and for tilting the front edgewall of the cartridge down toward the cartridge support surface when the deck is in the engaged position.

7. The cartridge tape drive of claims 1 or 4 further comprising an overcenter spring loading system for biasing the deck to move into and remain in the engaged position upon movement of the deck toward the engaged position from the disengaged position and for biasing the deck to move into and remain in the disengaged position upon movement of the deck toward the disengaged position from the engaged position.

8. The cartridge tape drive of claim 5 further comprising an overcenter spring loading system for biasing the deck to move into and remain in the engaged position upon movement of the deck toward the engaged position from the disengaged position and for biasing the deck to move into and remain in the disengaged position upon movement of the deck toward the disengaged position from the engaged position.

9. The cartridge tape drive of claim 6 further comprising an overcenter spring loading system for biasing the deck to move into and remain in the engaged position upon movement of the deck toward the engaged position from the disengaged position and for biasing the deck to move into and remain in the disengaged position upon movement of the deck toward the disengaged position from the engaged position.

10. The cartridge tape drive of claim 7 wherein the overcenter spring loading system comprises:
a first baseplate pin mounted at a first baseplate location on the baseplate;
a second baseplate pin mounted at a second baseplate location on the baseplate;
a first trip spring having a first end attached to a first deck location on the deck and a second end attached to the first baseplate pin; and
a second trip spring having a first end attached to a second deck location on the deck and a second end attached to the second baseplate pin.

11. The cartridge tape drive of claims 1, 2, 3 or 4 wherein the deck has a top side and a bottom side opposite the top side wherein the top side defines a cartridge support surface against which the cartridge slides upon insertion and ejection from the insertion port and upon movement of the pivotal deck between the engaged and disengaged positions, the cartridge tape drive further comprising a cartridge loading ramp attached to the pivotal deck and tilted toward the baseplate, the cartridge loading ramp positioned for guiding the cartridge onto the cartridge support surface upon insertion of the cartridge into the cartridge insertion port.

12. The cartridge tape drive of claims 1 or 4 further comprising a cartridge eject linkage means coupled to the engagement lever for ejecting the cartridge from the cartridge insertion port upon movement of the engagement lever into a predefined eject position.

13. The cartridge tape drive of claim 12 wherein the eject linkage means comprises:
a first connecting link having a first end and an elongated second idle slot along its length;
a second pin affixed to the engagement lever and extending into the second idle slot, the second pin moving along the second idle slot in response to movement of the engagement lever, the second pin contacting the first connection link at one end of the second idle slot to cause movement of the first connecting link in response to movement of the engagement lever into the eject position;
a second connecting link having a first end and a second end with a third idle slot through the second end;
a third pin fixed to the first end of the first connecting link and extending into the third idle slot for interconnecting the second connecting link to the first connecting link;
a fourth pin affixed to extend from the first end of the second connecting link;
a first pivot post affixed to the baseplate, the second connecting link having a central location between its first and second ends at which the second connecting link is pivotally mounted on the pivot post;
a fifth pin affixed to the baseplate;
a third connecting link having a first end pivotally mounted to the fifth pin and having a second end, the second end having a fourth idle slot therethrough, the fourth pin extending into the fourth idle slot for interconnecting the third connecting link to the second connecting link;
an eject link having a first end fixed to the first end of the third connecting link and pivotally mounted to the fifth pin, and a second end with a foot portion positioned for abutting against the innermost side edgewall of the cartridge renote from the engagement lever, the movement of the engagement lever into the eject position causing the first connecting link to pull against the second end of the second connecting link, to cause the second connecting link to rotate about the first pivot post, to cause the third connecting link and the eject link to pivotally and translationally move to cause the foot portion of the eject link to push against the side edgewall of the cartridge.

14. The cartridge tape drive of claim 13 further comprising a wound spirng positioned around the first pivot post and attached to the second connecting link for normally urging the engagement lever out of the eject position.

15. The cartridge tape drive of claim 1 wherein the cartridge door includes a door pivot for pivotally attaching the door the cartridge, a closure portion on one side of the door pivot, and an actuation portion on the other side of the door pivot whereby pressure applied against the actuation portion causes the door to pivot about the door pivot to open the door, the cartridge tape drive further comprising a cartridge door opening means comprising:
an angled door opening member defined by a base portion having a first end and a second end, and a top portion in an angled oreintation relative to the base portion, the base portion having a toe flange extending from the first end and a heel flange extending from the second end, the top portion extending in a direction away from the heel and toe flanges and terminating in a topmost end, the topmost end being pivotally interconnected to the housing;
a door opening pawl interconnected to the engagement lever and positioned to selectively and nonsimultaneously engage the toe flange and the heel flange upon movement of the engagement lever;
a door engagement plunger interconnected for being transitionally moved by the angled door opening member and positioned to selectively engage the actuation portion of the cartridge door; and
The door opening pawl positioned for being engaged by the toe flange as the engagement lever is moved to cause the angled door opening member to rotate about its topmost end in a first direction until the toe flange rotates out of engagement with the door opening pawl, the door engagement plunger being pressed against the actuation portion of the cartridge door to open the cartridge door as the angled door opening member rotates, the heel flange positioned for being engaged by the door opening pawl to rotate the angled door opening member in a second direction opposite the first direction for disengaging the door engagement plunger from the actuation portion of the cartridge door.

16. The cartridge tape drive of claim 15 further comprising overcenter spring loading means attached to the angled door opening member comprising:
a spring connecting flange extending from the housing;
a spring attachment clip on the angled door opening member, the topmost end of the top portion of the angled door opening member being generally between the spring attachment clip and the spring connecting flange; and an overcenter spring connected between the spring connecting flange and the spring attachment clip, the overcenter spring loading means maintaining the door engagement plunger in its respective door opening and door closing position until movement of the engagement lever occurs to rotate the angled door opening member.

17. A data cartridge tape drive for a data tape cartridge having therein a length of magnetic recording tape, the cartridge having a top member; a bottom member with a top surface facing toward the top member and a bottom surface facing away from the top member; a peripheral edgewall defined by a rear edgewall, a front edwall and first and second side edgewalls opposite each other between the front edgewall and the rear edgewall, the front edgewall having a cutaway therein at a location adjacent the first side edgewall; a pivotal door for selectively closing the cutaway; a first indexing edge along the front edgewall between the cutaway and the first side edgewall; a second indexing edge along the front edgewall adjacent the second side edgewall; a first indexing surface on the top surface of the bottom member adjacent to the first indexing edge; and a second indexing surface on the top surface of the bottom member adjacent to the second indexing edge, the cartridge defining a center axis between its first and second sidewalls defining a center-of-gravity of the cartridge along its length, the data cartridge tape drive comprising:

a housing having
a generally rectangular frame defining a peripheral edge of the housing, the frame having a front portion, a back portion and two spaced side portions between the front and back portions,
a baseplate attached to the frame providing a bottom of the housing,
a facia member attached to the frame across one end thereof, the facia member having a cartridge insertion port therethrough, and
a cover member attached to the frame for providing a top of the housing;
a pivotal deck pivotally mounted to the baseplate for pivotal movement between an engaged position and disengaged position;
a first index pin fixedly mounted to the deck;
an index sleeve mounted over the first index pin to rotate therearound, the first index pin positioned so that the index sleeve mounted thereover abuts against the first indexing edge of the cartridge when the deck is in the engaged position;
a second index pin fixedly mounted to the deck and positioned for engaging the second indexing edge after the index sleeve contacts the first indexing edge upon pivotal movement of the deck to the engaged position, the deck being seelctively pivotal to bring the index sleeve into contact with the first indexing edge, the index sleeve thereafter rotating as the first index pin moves longitudinally along the first indexing edge until the second index pin contacts the second indexing edge.

18. The data cartridge tape drive of claim 17 further comprising a tilt stop protruding from the frame toward the interior of the housing at a location for abutting against the rear edgewall of the cartridge adjacent the second side edgewall when the cartridge is fully inserted into the cartridge insertion port but before the deck is pivoted to the engaged position.

19. The data cartridge tape drive of claim 18 further comprising an offset fulcrum protruding from the frame toward the interior of the housing at a location for abutting against the rear edgewall of the cartridge at a central location between the first and second side edgewalls of the cartridge when the cartridge is inserted in the cartridge insertion port, the cartridge being pivotal about the offset fulcrum for pivoting the rear edgewall of the cartridge out of contact with the tilt stop in response to engagement of the second index pin and the index sleeve against the second and first indexing edges of the cartridge respectively as the deck rotates into the engaged position.

20. The tape drive of claim 19 wherein the offset fulcrum comprises:
a fixed pin having a top and a bottom, each mounted in the frame and oriented vertically in the region between the cover member and the baseplate;
a sleeve pivotally mounted on the fixed pin;
a first balance spring around the top of the fixed pin between one end of the sleeve and the frame; and
a second balance spring around the bottom of the fixed pin between the other end of the sleeve and the frame, the first and second balance springs for limiting vertical movement of the sleeve along the fixed pin.

21. The data cartridge tape drive of claim 19 wherein the offset fulcrum has a cartridge contacting surface which is contoured to promote pivotal movement of the cartridge therealong.

22. The data cartridge tape drive of claims 17 or 18 further comprising an engaged position detection circuit coupled between the index sleeve and the second index pin for generating an engaged signal when both the index sleeve and the second index pin are in contact with the cartridge.

23. The data cartridge tape drive of claim 22 wherein the cartridge inserted in the insertion port has a signal path between the first and second indexing edges, and wherein the index sleeve and the second index pin are electrically conductive.

24. The data cartridge tape drive of claims 17, 18 or 19 further comprising a cartridge support member along the baseplate adjacent the frame and positioned for supporting the bottom of the cartridge adjacent the rear edgewall of the cartridge at a central position between the first and second side edgewalls thereof for positioning of the cartridge relative to the deck.

25. The data cartridge tape drive of claim 17 further comprising:
a magnetic read/write head mounted on the deck; and
vertical positioning means for vertically aligning and positioning the front edgewall of the cartridge relative to the magnetic read/write head whereby the magnetic read/write head contacts a preselected position across the width of the magnetic recording tape for enabling data to be communicated between the magnetic read/write head and the magnetic recording tape.

26. The data cartridge tape drive of claim 25 wherein the vertical positioning means comprises:
a center-of-gravity pad protruding up from the deck at a location for contacting the center-of-gravity of the cartridge when the deck is in the engaged position to cause the front edgewall of the cartridge to be titled toward the deck.

27. The data cartridge tape drive of claim 17, 25 or 26, further comprising:
a tilt stop protruding from the frame toward the interior of the housing at a location for abutting against the rear edgewall of the cartridge adjacent to the second side edgewall with the cartridge is fully inserted into the cartridge insertion port and with the deck not in to the engaged position;
an offset fulcrum protruding from the frame toward the interior of the housing and positioned at a location for abutting against the rear edgewall of the cartridge at a central location between the first and second side edgewalls of the cartridge with the cartridge is fully inserted in the cartridge insertion port; and
a tilt cam protruding from the deck and positioned for engaging the second side edgewall adjacent to the rear edgewall for stopping further insertion of the cartridge into the housing and for urging the cartridge into contact against the tilt stop as the deck is pivoted toward the engaged position but disengaging from the second side edgewall when the deck reaches the engaged position, the index sleeve pressing the first indexing edge to rotate the cartridge about the offset fulcrum and rotate the cartridge away from the tilt stop to cause the second index pin to contact the second indexing edge when the deck is in the engaged position.

28. The data cartridge tape drive of claim 17 wherein the deck further comprises a cartridge loading ramp extending from one edge of the deck facing the insertion port for being contacted by the second side edgewall of the cartridge during insertion thereof for guiding the cartridge to slide across the deck during such insertion.

29. The data cartridge tape drive of claim 17 or 25 further comprising means for pressing against the top of the cartridge inserted in the housing to hold the cartridge in a preselected position in the housing when the deck is in the engaged position.

30. The data cartridge tape drive of claim 26 further comprising means for pressing against the top of the cartridge inserted in the housing, the means for pressing positioned to press against the top of the cartridge along the center axis of the cartridge.

31. The data cartridge tape drive of claim 30 wherein the means for pressing comprises:
a loading ball;
a ball retainer interconnected to the housing for retaining the loading ball in an orientation to press against the top of the cartridge along its center axis when the cartridge is fully inserted in the housing; and
a spring positioned for pressing the ball in the ball retainer agaisnt the top of the cartridge.

32. The data cartridge drive of claim 29 wherein the means for pressing comprises:
a loading ball;
a ball retainer interconnected to the housing for retaining the loading ball in an orientation to press against the top of the cartridge along its center axis when the cartridge is fully inserted in the housing; and
a spring positioned for pressing the ball in the ball retainer against the top of the cartridge.

33. The data cartridge tape drive of claim 17 wherein the housing further comprises:
an insulation member positioned for extending into the back portion of the housing to define a concavity in the housing; and
a drive motor attached to the outside of the housing in the concavity whereby the interior of the housing is thermally insulated from the drive motor by the insulation member.

34. The data cartridge tape drive of claim 33 wherein the insulation member is concave in shape and is made of a ceramic material.

35. The data cartridge tape drive of claim 17 wherein the cover member comprises a circuit board.

36. The data cartridge of claim 17 further comprising:
a bridge member interconnected between the two side portions of the frame adajcent to the cover member and oriented to be generally parallel to but spaced from the facia member;
a ball retainer interconnected to the bridge member;
a loading ball positioned in the ball retainer for being retained thereby;
a spring positioned for pressing the loading ball in the ball retainer against the top of the cartridge inserted in the housing.

37. The data cartridge of claim 36 wherein the ball retainer is positioned for pressing against the top of the cartridge along its center axis when the cartridge is fully inserted in the housing.

38. A data cartridge tape drive for a data cartridge having therein a roll of magnetic recording tape, the cartridge having a top member; a bottom member with a top surface facing toward the top member and a bottom surface facing away from the top member; a peripheral edgewall defined by a rear edgewall, a front edgewall and first and second side edgewalls opposite each other between the front edgewall and the rear edgewall, the front edgewall having a cutaway therein at a location adjacent the first side edgewall; a pivotal door for selectively closing the cutaway; a first indexing edge along thr front edgewall between the cutaway and the first side edgewall; a first indexing surface on the top surface of a bottom member adjacent to the first indexing edge; and a second indexing surface on the top surface of the bottom member adjacent to the second indexing edge, the cartridge having a center axis between its first and second sidewalls defining therealong a center-of-gravity extending through the cartridge between the top and bottom members, the data cartridge drive comprising:
a housing comprising:
a generally rectangular frame defining a peripheral edge of the housing, the frame having a front poriton, a back portion and two spaced apart side portions, between the front and the back portions,
a baseplate attached to the frame defining a bottom closure of the housing,
a facia member attached to the frame across one end thereof, the facia member having a cartridge insertion port therethrough, and
a cover member attached to the frame for providing a top closure of the housing;
a deck privotally mounted to the baseplate for pivotal movement between an engaged position and disengaged position;
a first hook bracket extending from the deck toward the cover member of the housing and having a horizontal bill with a deck facing surface positioned for contacting the first indexing surface of the cartridge when the deck is in the engaged position;

a first leaf spring attached to the deck and extending to a position spaced from but opposite the deck facing surface of the first hook bracket, the region between the first leaf spring and the deck facing surface of the first hook bracket defining a first slot for receiving the bottom member of the cartridge;

a first index pin mounted to the first hook bracket to extend from the deck facing surface thereof toward the deck;

an index sleeve rotatably mounted on the first index pin;

a second hook bracket extending from the deck toward the cover member and having a horizontal bill with a deck facing surface positioned for contacting the second indexing surface of the cartridge when the deck is in the engaged position;

a second leaf spring attached to the deck and extending to a position spaced from but opposite the deck facing surface of the second hook bracket, the region between the second leaf spring and the deck facing surface of the second hook bracket defining a second slot for receiving the bottom member of the cartridge.

39. The data cartridge tape drive of claim 38 further comprising a tilt stop protruding from the frame toward the interior of the housing at a location for abutting against the rear edgewall of the cartridge adjacent the second side edgewall when the data cartridge is fully inserted into the cartridge insertion port with the deck not in the engaged position.

40. The data cartridge tape drive of claim 39 further comprising an offset fulcrum protruding from the frame toward the interior of the housing at a location for abutting against the rear edgewall of the cartridge at a central location between the first and second side edgewalls of the cartridge when the cartridge is inserted in the cartridge insertion port, the cartridge being pivotal about the offset fulcrum for moving the rear edgewall of the cartridge out of contact with the tilt stop in response to contact of the second index pin and the index sleeve against the second and first indexing edges of the cartridge respectively as the deck moves into the engaged position.

41. The tape drive of claim 40 wherein the offset fulcrum comprises:

a fixed pin having a top and a bottom, each mounted in the frame and oriented vertically between the top member and the baseplate;

a sleeve pivotally mounted on the fixed pin;

a first balance spring around the top of the fixed pin between one and of the sleeve and the frame; and a second balance spring around the bottom of the fixed pin between the other end of the sleeve and the frame, the first and second balance spring for limiting vertical movement of the sleeve along the fixed pin.

42. The data cartridge tape drive of claim 40 wherein the offset fulcrum has a cartridge contacting surface which is contoured to promote pivotal movement of the cartridge thereacross.

43. The data cartridge tape drive of claims 38, 39 or 40 further comprising a cartridge support member along the baseplate adjacent the frame positioned for supporting the bottom of the cartridge adjacent the rear edgewall of the cartridge at a central position between the first and second side edgewalls thereof for positioning of the data cartridge relative to the deck.

44. The data cartridge tape drive of claim 38 further comprises:

a magnetic read/write head mounted on the pivotal deck; and vertical positioning means for vertically aligning and positioning the cartridge relative to the magentic read/write head whereby the magnetic read/write head contacts a preselected position across the width of the magnetic recording tape for enabling data to be communicated between the magnetic read/write head and the magnetic recording tape.

45. The data cartridge tape drive of claim 44 wherein the vertical positioning means comprises:

a pad protruding up from the deck at a first location and position to contact the bottom of the cartridge on one side of the center axis of the cartridge when the deck is in the disengaged position for tilting the front edgewall of the cartridge up and away from the deck, the pad moving with the deck toward the center axis of the cartridge as the deck pivots toward the engaged position for tilting the front edgewall of the cartridge toward the deck when the deck is in the engaged position.

46. The data cartridge tape drive of claims 38, 44 or 45, further comprising:

a tilt stop protruding from the frame toward the interior of the housing at a location for abutting against the rear edgewall of the cartridge adjacent to the second side edgewall with the cartridge is fully inserted into the cartridge insertion port with the deck not in the engaged position;

an offset fulcrum protruding from the frame toward the interior of the housing and positioned at a location for abutting against the rear edgewall of the cartridge at a central location between the first and second side edgewalls of the cartridge with the cartridge is fully inserted in the cartridge insertion port; and a tilt cam protruding from the deck and positioned for engaging the second side edgewall adjacent to the rear edgewall for stopping further insertion of the cartridge into the housing and for urging the cartridge into contact against the tilt stop as the deck is pivoted toward the engaged position but disengaging from the second side edgewall when the deck reaches the engaged position, the index sleeving presses the first indexing edge to rotate the cartridge about the offset fulcrum and rotate the cartridge away from the tilt stop to cause the second index pin to contact the second indexing edge when the deck is in the engaged position.

47. The data cartridge tape drive of claim 38 wherein the deck further comprises a cartridge loading ramp extending from one edge of the deck facing the insertion port for being contacted by the second side edgewall of the cartridge during insertion thereof for guiding the cartridge to slide across the deck during such insertion.

48. The data cartridge tape drive of claim 38 or 44 further comprising means for pressing against the top of the cartridge inserted in the housing to hold the cartridge in a preselected position in the housing when the deck is in the engaged position.

49. The data cartridge tape drive of claim 45 further comprising means for pressing against the top of the cartridge inserted in the housing, the means for pressing positioned to press against the top of the cartridge along the center axis of the cartridge.

50. The data cartridge tape drive of claim 49 wherein the means for pressing comprises:
   a loading ball;
   a ball retainer interconnected to the housing for retaining the loading ball in an orientation to press against the top of the cartridge along its center axis when the cartridge is fully inserted in the housing;
   a spring positioned for pressing the ball in the ball retainer against the top of the cartridge.

51. The data cartridge tape drive of claim 46 further comprising means for pressing against the top of the cartridge inserted in the housing, the means for pressing positioned to press against the top of the cartridge along the center axis of the cartridge.

52. The data cartridge tape drive of claim 51 wherein the means for pressing comprises:
   a loading ball;
   a ball retainer interconnected to the housing for retaining the loading ball in an orientation to press against the top of the cartridge along its center axis when the cartridge is fully inserted in the housing;
   a spring positioned for pressing the ball in the ball retainer against the top of the cartridge.

53. The data tape drive of claim 38 wherein the housing further comprises:
   an insulation member positioned for extending into the back portion of the housing to define a generally cylindrical concavity in the housing; and
   a drive motor attached to the outside of the housing in the outer concavity whereby the interior of the housing is thermally insulated by the insulation member from heat generated by the drive motor.

54. The data cartridge tape drive of claim 53 wherein the insulation member is concave in shape and is made of a ceramic material.

55. The data cartridge tape drive of claim 38 wherein the cover member comprises a circuit board.

56. The data cartridge of claim 38 further comprising:
   a bridge member interconnected between the two side portions of the frame adjacent to the cover member and oriented to be generally parallel to but spaced from the facia member;
   a ball retainer interconnected to the bridge member;
   a loading ball positioned in the ball retainer for being retained thereby;
   a spring positioned for pressing the loading ball in the ball retainer against the top of the cartridge inserted in the housing.

57. The data cartridge of claim 56 wherein the ball retainer is positioned for pressing against the top of the cartridge along its center axis when the cartridge is fully inserted in the housing.

* * * * *